US007292897B2

(12) United States Patent
Miura et al.

(10) Patent No.: US 7,292,897 B2
(45) Date of Patent: Nov. 6, 2007

(54) MULTIPLEXING CONTROL SYSTEM AND MULTIPLEXING METHOD THEREFOR

(75) Inventors: Kazuhiko Miura, Hitachi (JP); Shoei Takahashi, Hitachi (JP); Kazuyasu Asakura, Hitachi (JP); Yoshio Maruyama, Mito (JP); Katsuhito Shimizu, Hitachi (JP); Yukiko Mori, Hitachi (JP); Tohru Akatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 815 days.

(21) Appl. No.: 10/721,411

(22) Filed: Nov. 26, 2003

(65) Prior Publication Data

US 2004/0114509 A1 Jun. 17, 2004

Related U.S. Application Data

(63) Continuation of application No. 10/220,468, filed on Nov. 12, 2002.

(30) Foreign Application Priority Data

Apr. 28, 2000 (JP) ............................ 2000-131743
Jul. 26, 2000 (JP) ............................ 2000-225003

(51) Int. Cl.
*G05B 19/18* (2006.01)
*G05B 19/04* (2006.01)

(52) U.S. Cl. .......................................... 700/3; 700/247

(58) Field of Classification Search .................... 700/3, 700/20, 21, 53, 247
See application file for complete search history.

(56) References Cited

U.S. PATENT DOCUMENTS 5,297,260 A * 3/1994 Kametani ................... 710/113
5,568,617 A * 10/1996 Kametani ................... 710/100
5,928,368 A * 7/1999 Jardine et al. ................ 714/22
5,951,683 A * 9/1999 Yuuki et al. ................... 713/1
5,970,226 A * 10/1999 Hoy et al. ..................... 714/25
6,181,929 B1 * 1/2001 Korinek et al. ............. 455/423
6,272,386 B1 * 8/2001 McLaughlin et al. ......... 700/82
6,298,289 B1 * 10/2001 Lloyd et al. .................. 701/13
6,438,586 B1 * 8/2002 Hass et al. .................. 709/213
6,618,628 B1 * 9/2003 Davlin et al. .................. 700/3
6,823,283 B2 * 11/2004 Steger et al. ............... 702/127

FOREIGN PATENT DOCUMENTS

JP 62-5402 1/1987
JP 01-267701 A 10/1989

(Continued)

*Primary Examiner*—Thomas K. Pham
(74) *Attorney, Agent, or Firm*—Dickstein Shapiro LLP

(57) ABSTRACT

A multiplexing control system has a common process input/output unit for distributing process signals from sensors for measuring the same state variable of a process to digital controllers. One process input/output unit for inputting/outputting a process signal between the multiplexing control system and plant is provided for each process signal. The process input/output unit for the process signal of high importance is triplexed. A process controller having an operating function is provided to each of the triplexed process input/output units. A process input/output unit for the process signal of intermediate importance is diplexed. A process input/output unit for the process signal of low importance is monoplexed. The process signals of the diplexed process input/output units and the monoplexed process input/output unit are controlled by a controller having a master right among the process controllers.

4 Claims, 19 Drawing Sheets

FOREIGN PATENT DOCUMENTS

| | | | |
|---|---|---|---|
| JP | 5-241606 | | 9/1993 |
| JP | 8-106301 | | 4/1996 |
| JP | 9-62304 | | 3/1997 |
| JP | 09-134208 | A | 5/1997 |
| JP | 09-292915 | A | 11/1997 |
| JP | 10-124408 | | 5/1998 |
| JP | 10-207591 | | 8/1998 |
| JP | 2000-112519 | | 4/2000 |

* cited by examiner

PRIORITY SETTING

| | PRIORITY |
|---|---|
| A SYSTEM | 1 |
| B SYSTEM | 2 |
| C SYSTEM | 3 |

| A SYSTEM | B SYSTEM | C SYSTEM |
|---|---|---|

D:DOWN,STOP
S:SLAVE
M:MASTER

FIG. 17

| 501 | 502 | 503 | 504 | 505 | 506 | 507 |
|---|---|---|---|---|---|---|
| 1 | GAS TURBINE RPM | 3 | AI | 1-5 | 1-5 | 1-5 |
| 2 | GAS TURBINE EXHAUST TEMPERATURE | 3 | AI | 1-6 | 1-6 | 1-6 |
| 3 | BATTERY ABNORMAL | 1 | DI | 2-1 | – | – |
| 4 | EXHAUST FAN FULL CLOSE | 2 | DI | 3-5 | 4-5 | – |
| 5 | EXHAUST FAN FULL CLOSE COMMAND | 2 | DO | 3-6 | 4-6 | – |
| 6 | EXHAUST FAN FULL OPEN | 2 | DI | 3-5 | 4-5 | – |
| 7 | EXHAUST FAN FULL OPEN COMMAND | 2 | DO | 3-6 | 3-6 | – |
| 8 | | | | | | |

MULTIPLEXING CONTROL SYSTEM AND MULTIPLEXING METHOD THEREFOR

CROSS-REFERENCE TO RELATED APPLICATION

The present application is a continuation application of U.S. patent application Ser. No. 10/220,468, filed on Nov. 12, 2002, the disclosure of which is incorporated by reference herein.

FIELD OF THE INVENTION

The present invention relates to a multiplexing control system and a multiplexing method therefor in which processes in a variety of plants such as an electric power generation plant and a chemical plant are controlled by a digital controller of such as a plurality of microcomputers via a process input/output unit.

BACKGROUND OF THE INVENTION

With regard to such as recirculation pump control in nuclear power generation plants, gas turbine control and steam turbine control in thermal power generation plants and controls in variety of plants such as chemical plants, a stable operation thereof is demanded in the world, therefore, protective functions of particularly high importance for enhancing reliability and safety of the plant control are constituted by hard wire circuits. However, in response to cost reduction requirement the hard wire circuits are these days being constituted by soft wares, however, in order to maintain reliability and safety, the soft wares are constituted in a triplex structure.

In a conventional triplex control system, each process input/output unit is independently connected to each of three microcomputers in a redundant structure, and the system is constituted so that the output signals are selected at the outside thereof. Further, in order to simplify the external circuit, as disclosed, for example, in JP-A-5-241606 a method of forming the output signal by summing the three signals is proposed.

Further, inputting/outputting of process variables and monitoring thereof in a multiplexed control system are performed through a separate provision of a microcomputer exclusive for the monitoring and an input/output hard interface unit. In this instance, the input/output are performed via an input/output hard interface unit exclusive for input/output and monitoring other than a control use microcomputer and information is sent to all of the control use microcomputers via transmission, thereby, standardization of information is designed.

Further, as disclosed in JP-A-08-106301, processing units and a process input/output unit are connected via triplexed lines, and a circuit which determines connection of to which unit among the units and data use of in which line among the lines is incorporated within the process input/output unit, thereby, a provision of a common process input/output unit other than the triplexed process input/output unit can be achieved to realize a cost reduction of the system.

DISCLOSURE OF THE INVENTION

With one of the above conventional art in which the system is constituted by connecting each process input/output unit independently to each of the three processor units in a redundant structure, even if a single input sensor is sufficient for an input signal, such as an amplifier is required for inputting the signal into the three process input units, and further the output signals outputted from the three process output units require at the outside thereof a circuit which selects one of the output signals for the plant which arises problems with regard to cost and size thereof. Further, when all of the signals inputted/outputted to and from the-process control unit are connected to the process input/output unit in this scheme, these circuits become huge, thereby, the failure rate rises as well as number of parts increases which is undesirable from a view point of maintenance. Further, with the device disclosed in JP-A-5-241606 the hardware thereof can be reduced but the amount thereof insubstantial and the substantial advantage thereof is insignificant.

Still further, with the above conventional art in which inputting/outputting of process-variables and monitoring thereof in a multiplexed control system are performed through a separate provision of a microcomputer exclusive for the monitoring and an input/output hard interface unit, it requires a transmission time which increases a response time and arises a problem of necessitating a long control time.

Still further, with the conventional art disclosed in JP-A-08-106301 since the processor units and the process input/output unit are connected via triplexed lines as well as a circuit for connection change-over is provided for each of the process input/output units, the circuit thereof complexes in comparison with a usual process input/output unit and a problem arises that a significant cost increase can not be avoided in order to keep reliability when using the hard wire circuits.

The present invention is carried out for countermeasuring the above problems and a first object of the present invention is to provide a multiplexing control system which shows fast response characteristic and high reliability.

Further, a second object of the present invention is to provide a low cost, high reliability and small sized multiplexing control system and a multiplexing method therefor.

In the present invention which achieves the first object, a common process input/output unit is provided for distributing respective plural process signals detected by plural sensors corresponding to multiplexing number, which are to detect the same state variable of a process, to digital controllers.

More specifically, regardless to the number of microcomputers through the use of comparable number of interface broads as the number of microcomputers in a single input/output hard interface unit, the input/output hard interface unit can be used in common, thereby, inputting/outputting can be performed in parallel without using the transmission which drastically shortens the control time.

Through thus constituting, no process signal transmission time is required, thereby, a multiplexing control having a fast response characteristic and a high reliability can be achieved.

According to the present invention which achieves the second object of the present invention, the redundant structure in the process input/output units into and from which the concerned process signals are inputted and outputted is varied depending on the types of the process signals, further, the system is constituted in such a manner that the signals of the input/output units having a low redundancy are inputted and outputted via an input/output unit having a high redundancy.

Further, one process input/output unit which inputs and outputs process signals with a plant is provided for every process signal, the process input/output unit for the process signal of a "high" importance is triplexed as well as a process controller having a processing function is provided for each of the triplexed input/output units, the process input/output unit for the process signal of an "intermediate" importance is diplexed, the process input/output unit for the process signal of a "low" importance is monoplexed as well as the output of the respective process signals of the diplexed input/output unit and the monoplexed input/output unit is constituted to be processed by either of the process controllers.

Further, by designating one of the triplexed process controller as having a master right the system is constituted in such a manner that the output control of the diplexed input/output unit and the monoplexed input/output unit is performed by the unit having the master right.

Still further, the object of the present invention can be achieved in such a manner that one process input/output unit which inputs and outputs the process signals with a plant is provided for every process signal and the redundancy structure of the input/output units for inputting and outputting process signals are either triplexed, diplexed or monoplexed depending on importance of the process signals. Namely, not triplexing all of the units constituting the plant control device only the units for the process signals having high importance are triplexed and other units are either diplexed or monoplexed, thereby, the amount of hardware can be reduced and the size and cost reduction of the device can be realized without damaging reliability.

Further, since the system is constituted so that the process controller having the master right supports all of the units, a further cost reduction thereof can be realized.

BRIEF DESCRIPTION OF DRAWINGS

FIG. 17 is a diagram showing an input and output list (table) of PI/O;

PREFERRED EMBODIMENTS FOR CARRYING OUT THE INVENTION

Hereinbelow, an embodiment according to the first invention will be explained.

Figure 1:
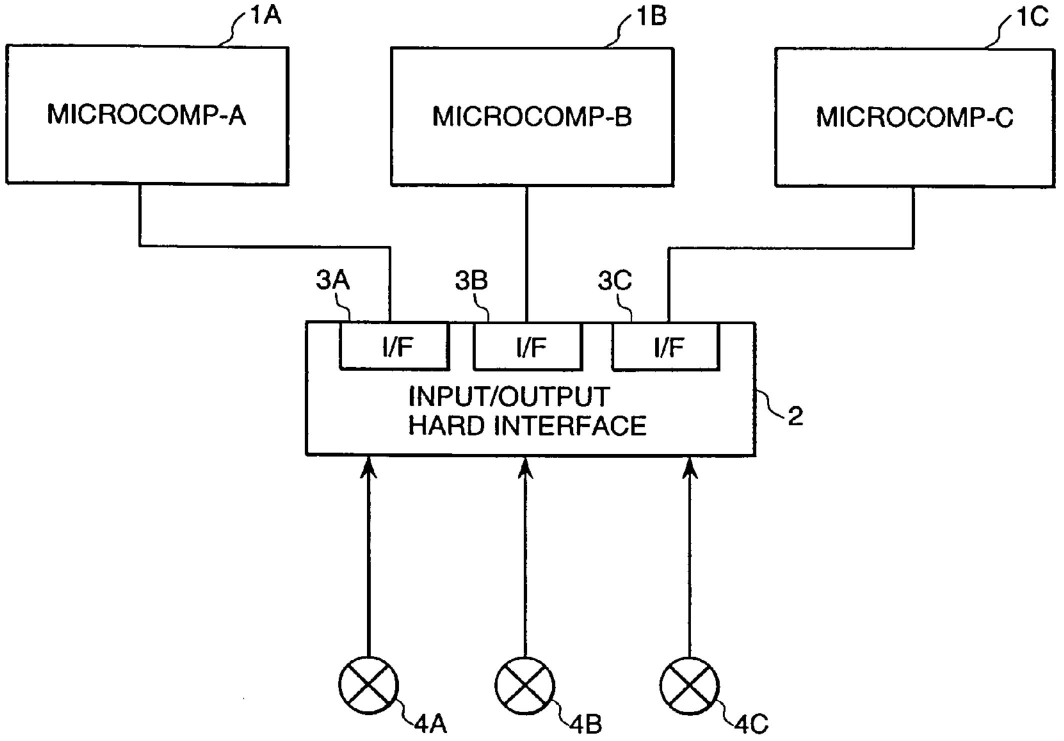
FIG. 1 is a constitutional diagram showing an embodiment according to the first invention.
Figure 2:
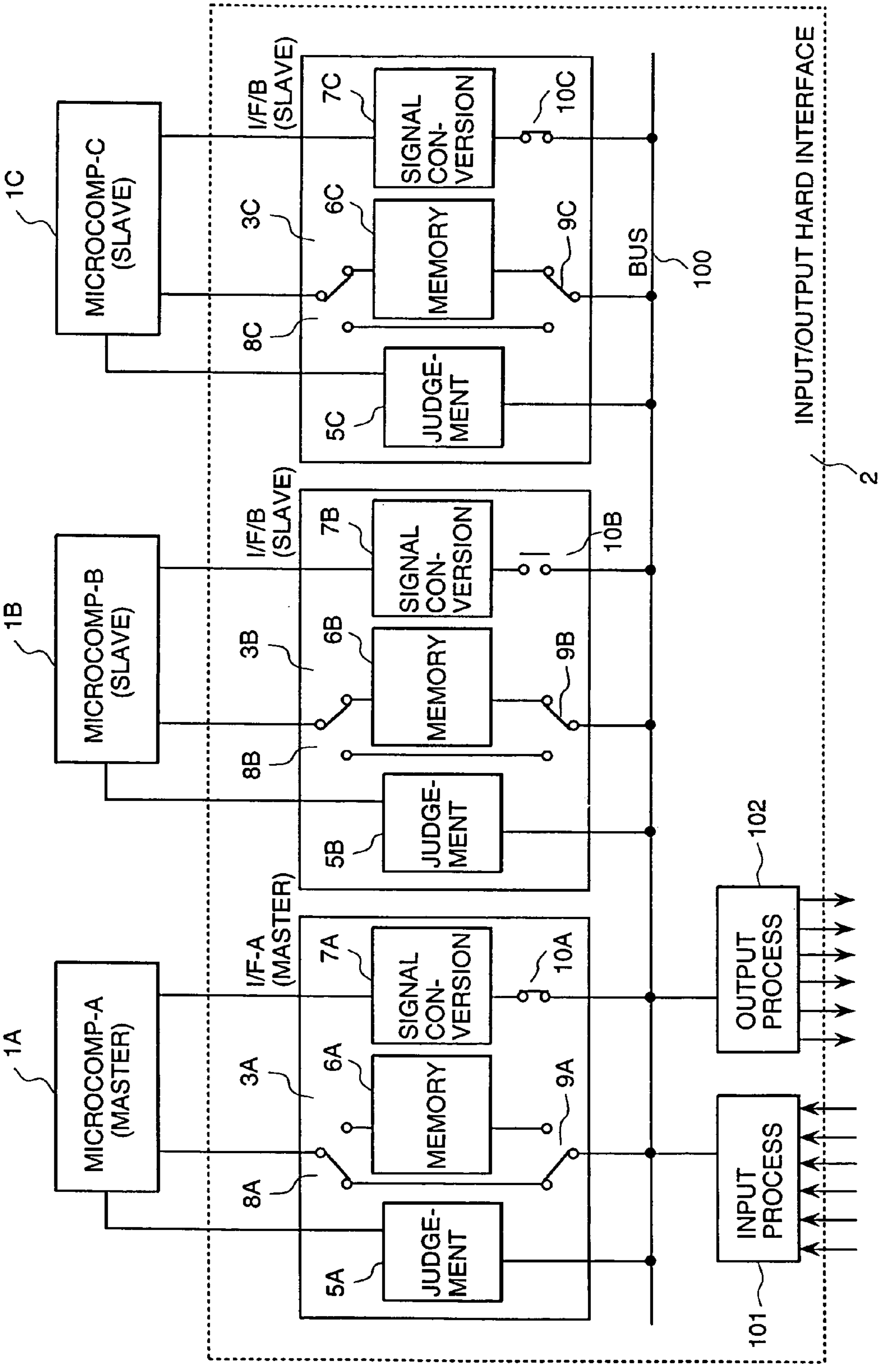
FIG. 2 is an exemplary detailed-constitutional diagram of a major portion of the embodiment according to the first invention.

FIGS. 1 and 2 show a structure of a multiplexed control system (through triplexing microcomputers) representing an embodiment according to the present invention.

The multiplexed control system as shown in FIG. 1 is constituted by three microcomputers (1A-1C) and an input/output hard interface 2 provided in common for the three microcomputers, and the input/output hard interface 2 is inputted of process signals from three sensors (4A-4C) and distributes the process signals to the microcomputers (1A-1C) via interface boards (3A-3C).

FIG. 2 shows the detailed structure of the multiplexed control system as shown in FIGS. 1, 1A, 1B and 1C are microcomputers, 5A, 5B and 5C are judgement units, 6A, 6B and 6C are memories, 7A, 7B and 7C are signal conversion units, 101 is an input/output processing unit and 102 is an output processing unit, and the system performs the following operations.

1) Data Output

Figure 3:
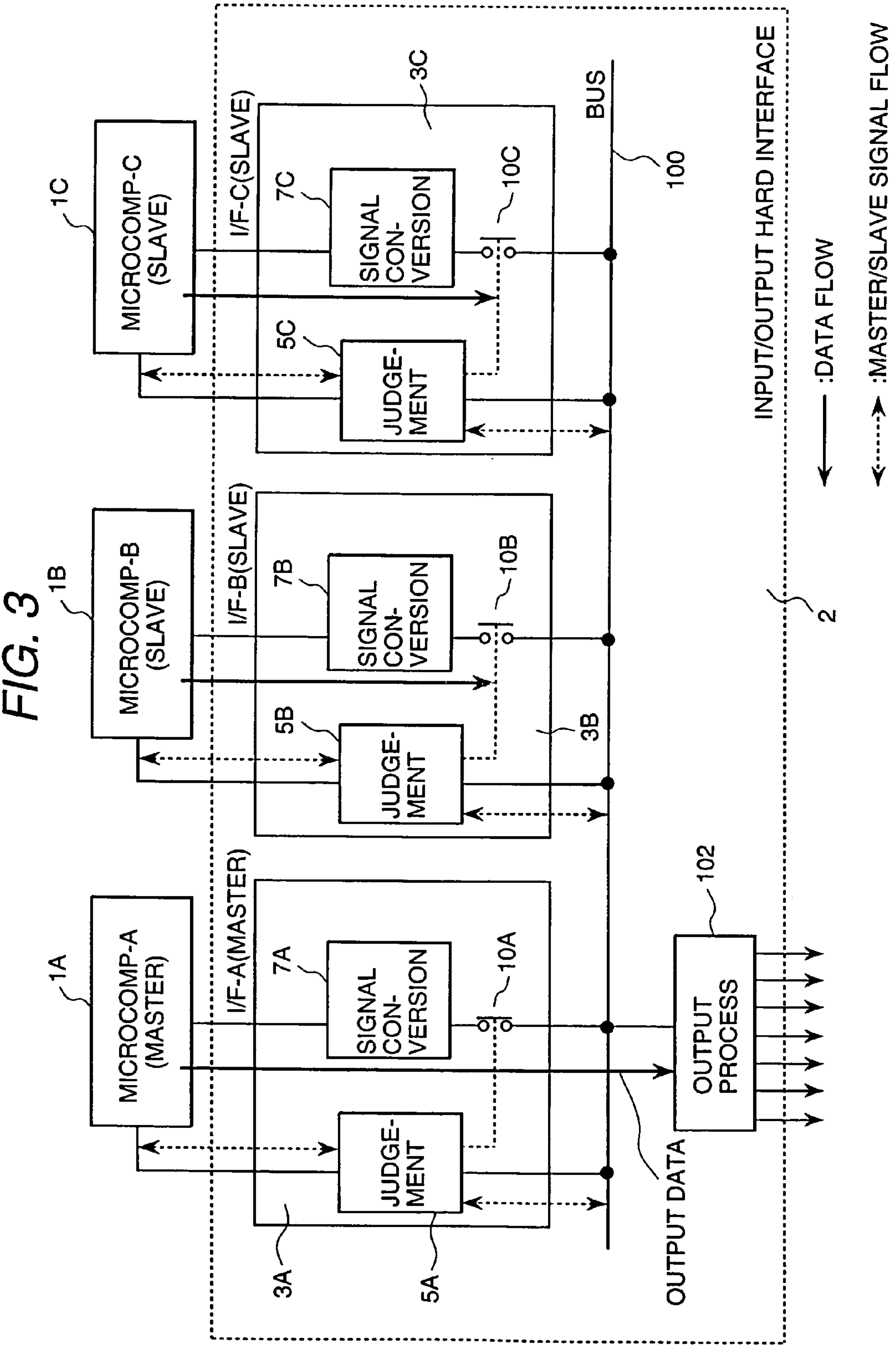
FIG. 3 is a view for explaining an operation of the first invention.
Figure 4:
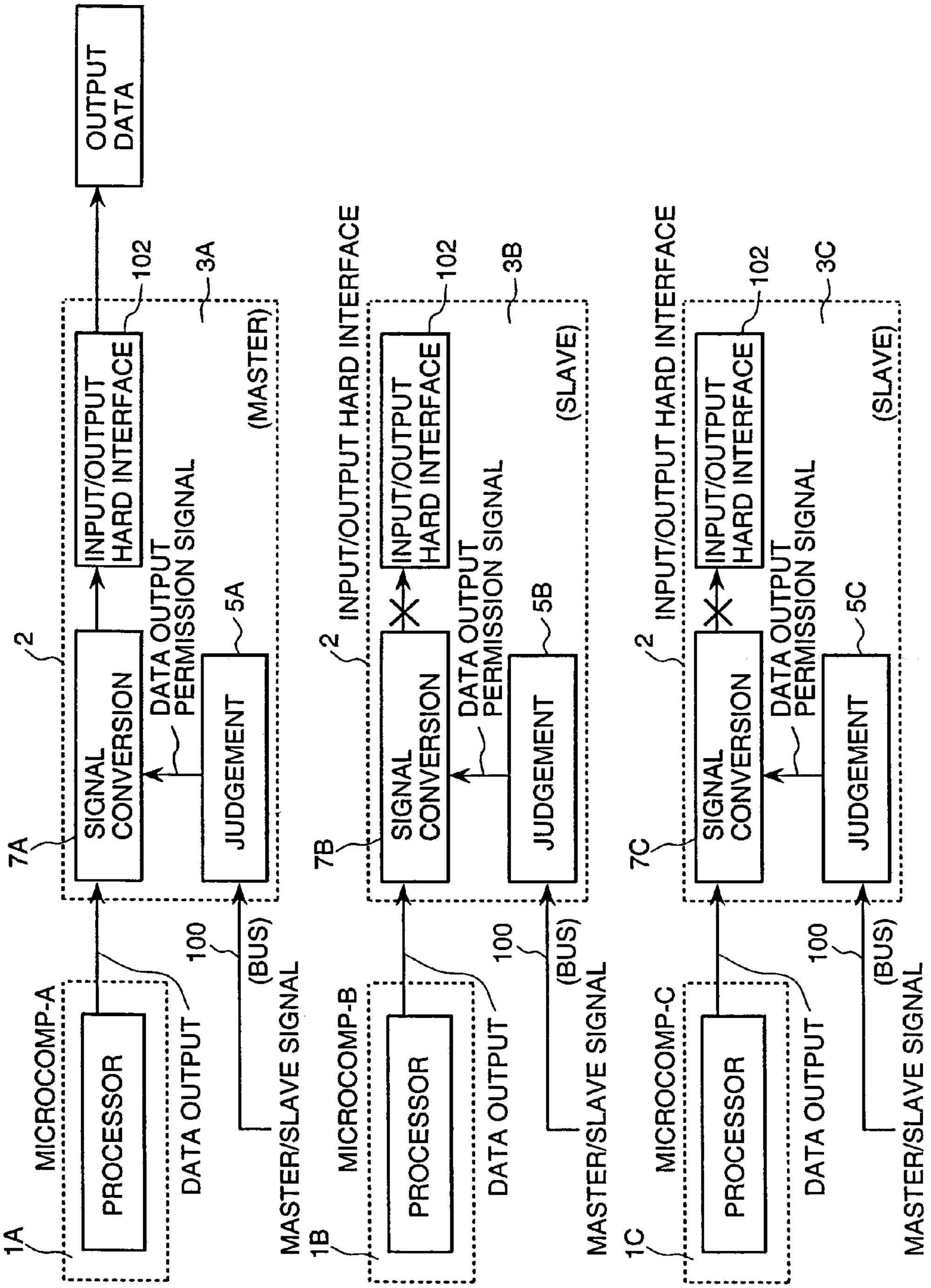
FIG. 4 is a view for explaining an operation of the first invention.

As shown in FIGS. 3 and 4, the microcomputer (master) 1A outputs a master signal to the judgement unit 5A so as to set the connected interface board as a master interface board (an output permission command for the interface board). When judgement unit 5A recognizes as the master, the unit outputs data output permission signal in the signal conversion unit 7A.

The microcomputer (master) 1A performs writing into the output processing unit 102 via the signal conversion unit 7A and the output processing unit 102 performs data output to outside. In contrast, the microcomputers (slaves) 1B and 1C output slave signals to the judgement units 5B and 5C so as to set the connected interface boards as slave interface boards (output prohibition commands for the interface boards). When the judgement units 5B and 5C recognizes as the slaves, the units output data output prohibition signals in the signal conversion units 7B and 7C.

Although the microcomputers (slaves) 1B and 1C perform writing into the signal conversion units 7B and 7C, the signal conversion units do not perform outputting because of the output prohibition but perform only response to the microcomputers 1B and 1C.

Figure 8:
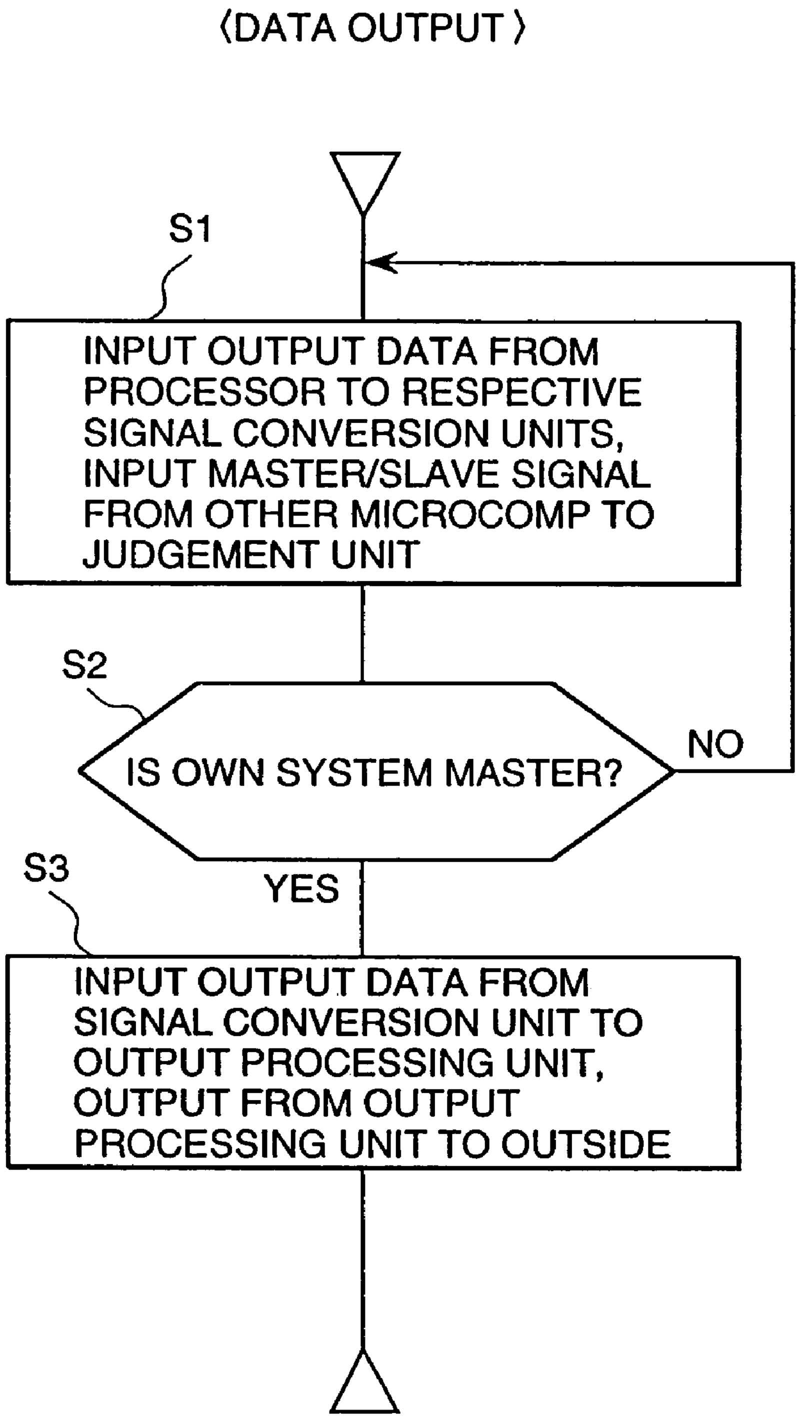
FIG. 8 is a flowchart for explaining an operation of the first invention.

The data output processing is performed through steps S1-S3 in FIG. 8.

Namely, output data are inputted from respective processing units of the microcomputers (1A-1C) to the respective signal conversion units and the master/slave signals from other microcomputers are inputted to the judgement unit (S1). Subsequently, it is recognized whether or not the respective microcomputers (1A-1C) are master (S2), and if it is determined as the master, the output data from the signal conversion unit is inputted to the output processing unit and the same is outputted from the output processing unit to the outside.

2) Data Input

Figure 5:
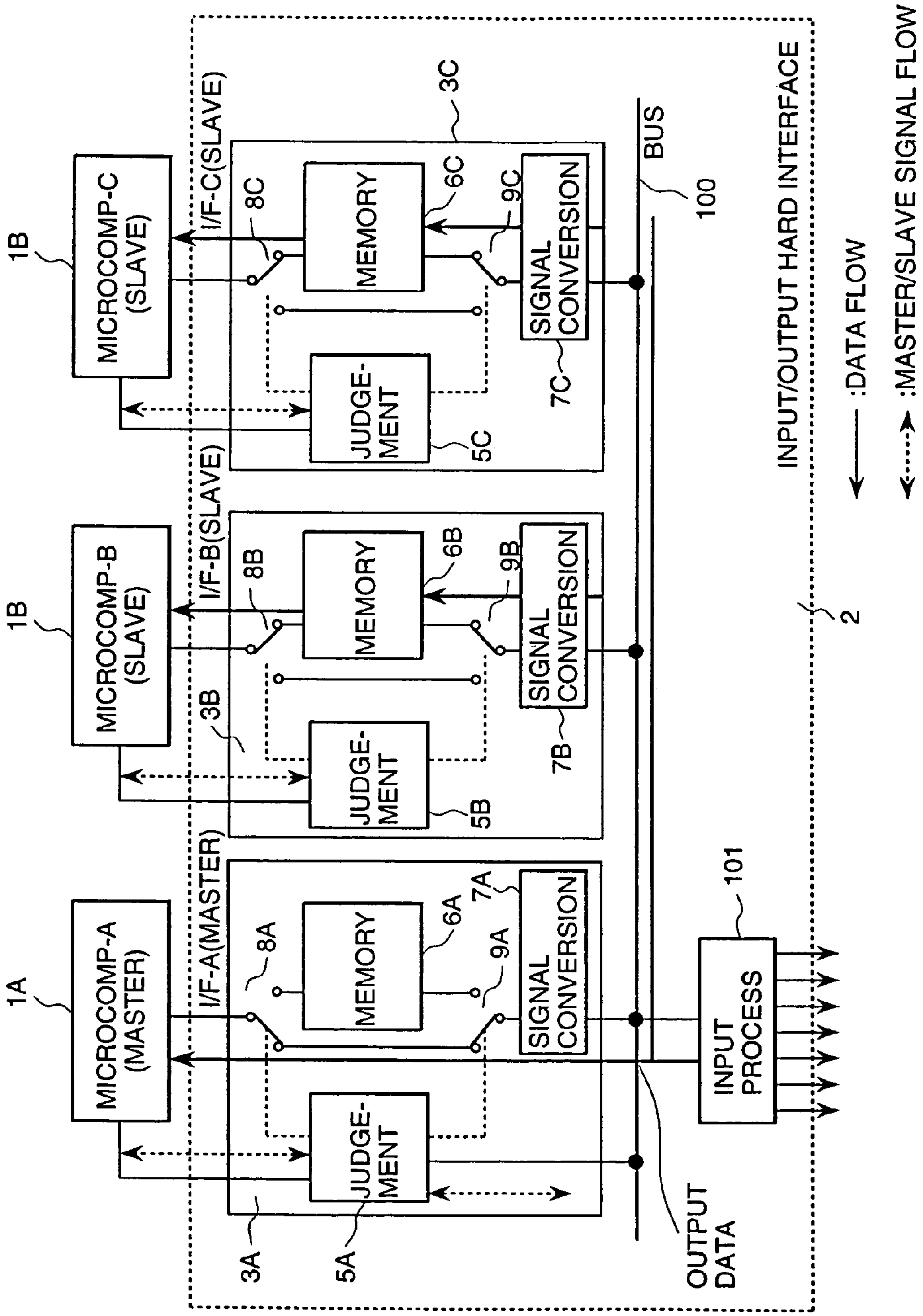
FIG. 5 is a view for explaining an operation of the first invention.
Figure 6:
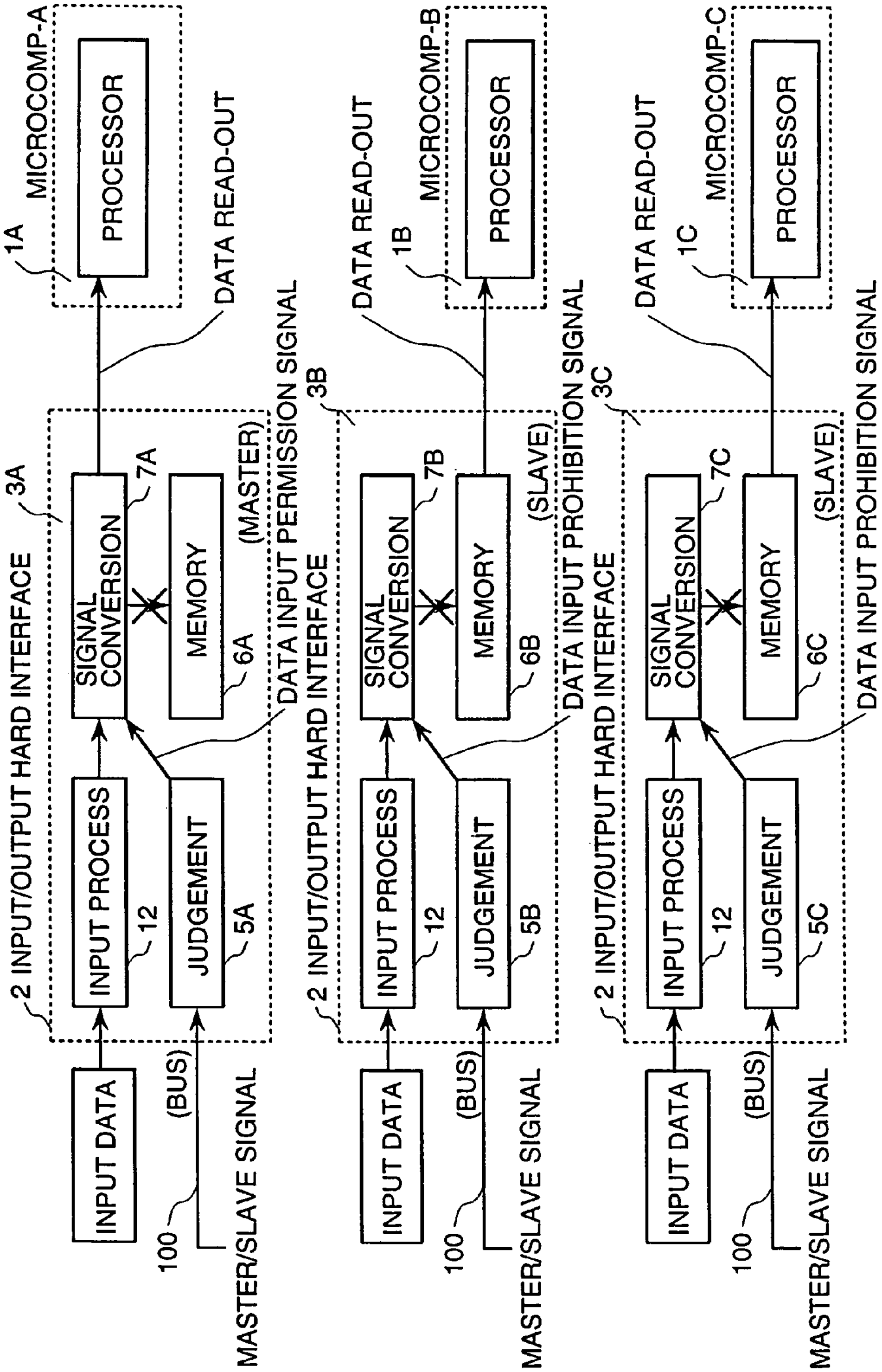
FIG. 6 is a view for explaining an operation of the first invention.

As shown in FIGS. 5 and 6, the input processing unit 101 inputs data to the respective interface boards 3A, 3B and 3C. Wherein, the microcomputer (master) 1A outputs a master-signal to the judgement unit 5A so as to set the connected interface board as the master interface board (an input permission command for the interface board).

When the judgement unit 5A recognizes as the master, the unit outputs the data input permission signal in the signal conversion unit 7A. Thereby, the microcomputer (master) 1A performs inputting from an input processing unit 12 via the signal conversion unit 7A.

In contrast thereto, the microcomputers (slaves) 1B and 1C output the slave signals to the judgement units 5B and 5C so as to set the connected interface board as the slave interface boards (input prohibition commands for the interface boards). When the judgement units 5B and 5C recognize as the slaves, the data are written in the memories 6B and 6C so as to output the data input prohibition signals for the signal conversion units and the microcomputers (slaves) 1B and 1C perform inputting from the memories 6B and 6C. Thereby, the microcomputers (slaves) 1B and 1C are permitted to be inputted of the same data as the microcomputer (master) 1A.

Figure 9:
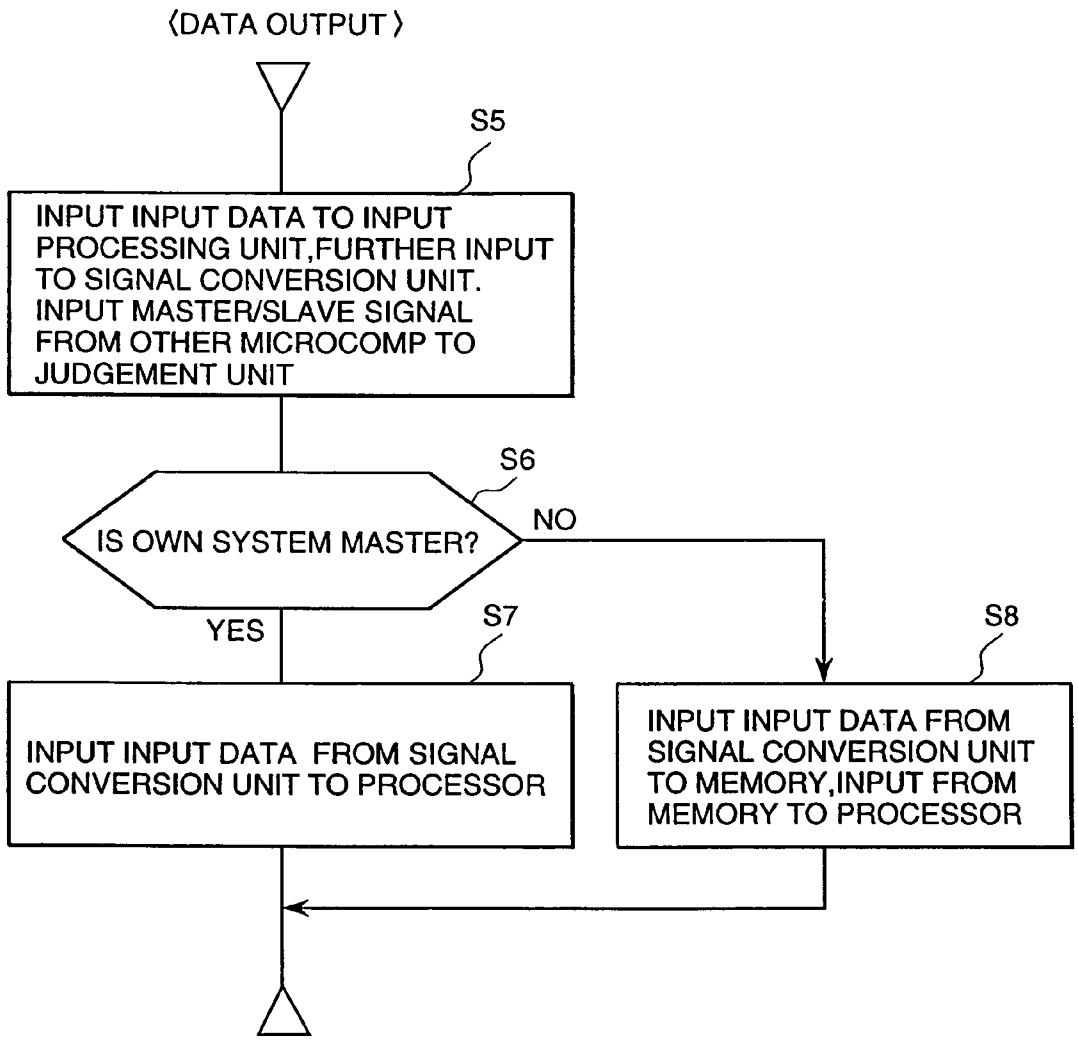
FIG. 9 is a flowchart for explaining an operation of the first invention.

The data input processing is performed through steps S5-S8 in FIG. 9.

Namely, the respective microcomputers (1A-1C) input data into the input processing units, output the same to the signal conversion units and input the master/slave signal from other microcomputers to the judgement unit (S5). Subsequently, the respective microcomputers (1A-1C) recognize whether or not the same is the master (S6), and if it is determined as the master, the input data from the signal conversion unit is inputted to the processing unit in the microcomputer (S7). If it is determined as not the master, the input data from the signal conversion unit are inputted to the memory in the input/output hard interface and the same are inputted from the memory to the processing unit in the microcomputer (S8).

3) Master/Slave Change-Over

Figures 7A, 7B:
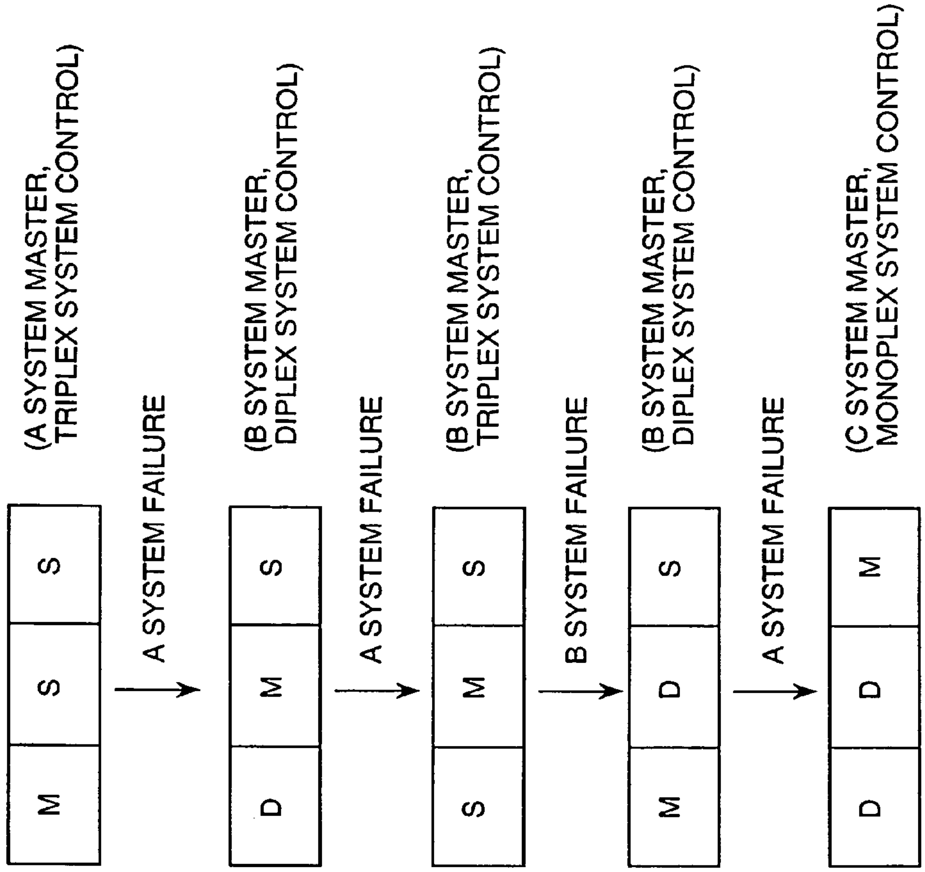
FIG. 7 is a view for explaining an operation of the first invention.

The microcomputers 1A, 1B and 1C for the multiplexing control device include a priority selection function for the interface boards. With regard to the change-over of priority selection for the interface boards priority is determined in advance as shown in FIG. 7(*a*) and the change-over of the master/slave is performed accordingly. Each of the interface boards always monitors own microcomputer and the state of the other interface boards (normal/abnormal and master/slave).

At the time of master failure, the master is change-over to a microcomputer having high priority among other normal systems, but at the time of slave failure and restoration no master change-over is performed. Further, when the own microcomputer fails, the function thereof is stopped. For example, when the system is controlled through a triplex system as shown in FIG. 7, and when A system fails, the master is changed over to B system and even if the A system is restored thereafter, the master rechange-over never occurs. Further, if B system fails, A system having high priority among other normal systems is selected as the master. Then, the A system fails, C system of only normal system is selected as the master. Through the use of such master/slave change-over selection function the output/input control is performed.

Figure 10:
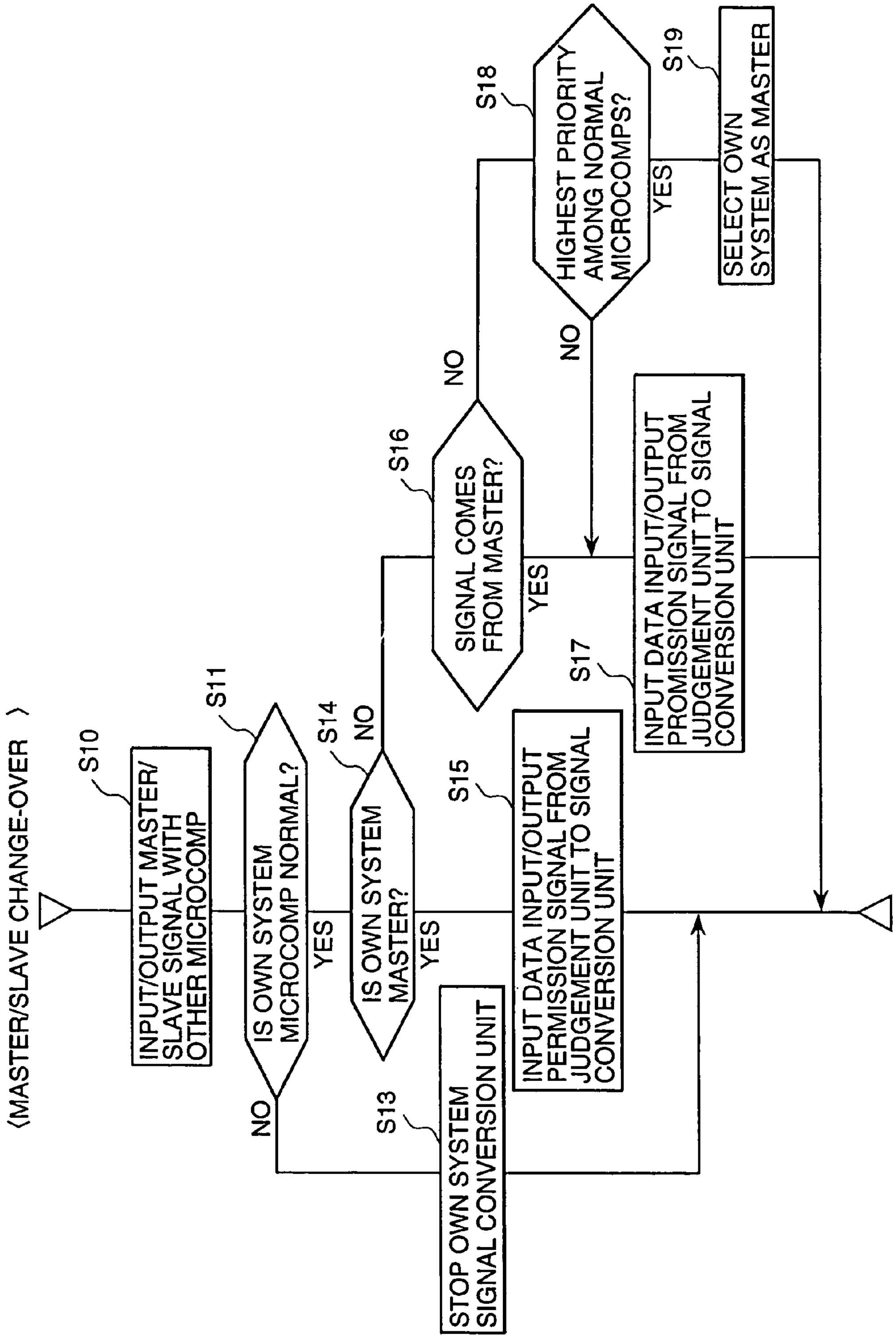
FIG. 10 is a flowchart for explaining an operation of the first invention.

The master/slave change-over processing is performed through step S10-S19 in FIG. 10.

Namely, the own system microcomputer inputs and outputs the master/slave signal with other microcomputers (S10). Subsequently, it is judged whether the own system microcomputer is normal (S11).

In case of not normal, the signal conversion unit in the own system is stopped (S13).

In case of normal, it is judged whether the own system is master (S14) and if it is determined as master, data input/output permission signal is inputted from the judgement unit in the microcomputer to the conversion unit (S15). If it is determined as not master, it is judged whether a signal comes from the master (S16) and if it is determined that the signal has come, the data input/output prohibition signal is inputted from the judgement unit in the microcomputer to the signal conversion unit (S17). If the signal has not come, it is judged whether the own system is the highest priority among the normal microcomputers, and if it is determined the highest, the master is selected for the own system (S19). If not the highest, the data input/output prohibition signal is inputted from the judgement unit in the microcomputer to the signal conversion unit (S17).

4) Countermeasure at the Time of Failure

When a microcomputer and an interface board fail, since only the failed system can be removed, thereby, the device can be restored without stopping the same.

Now, embodiments according to the second invention will be explained.

Figure 11:
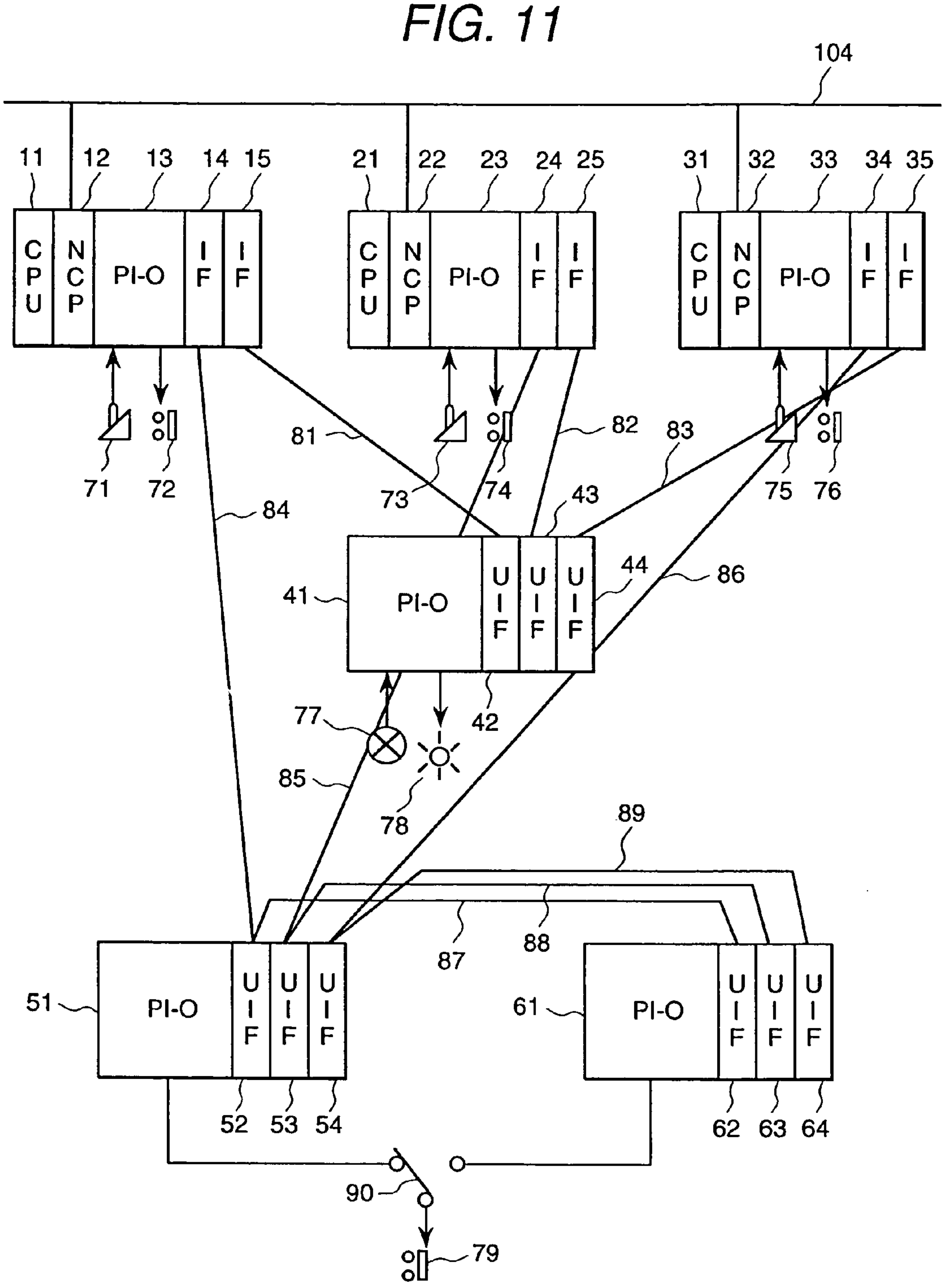
FIG. 11 is a constitutional diagram of a plant control system representing an embodiment according to the second invention.

FIG. 11 is a system constitutional diagram of a plant control device representing an embodiment thereof. The present embodiment, is characterized in that respective triplexed process input/output units (PI/O) 13, 23 and 33 and respective digital control units (CPU, sometimes also called as process controller) 11, 21 and 31 having three processing capacities constituted in a triplex system are respectively unified as CPU units, respective process input/output units 51 and 61 in a diplex system and one 41 in a monoplex system are connected respectively to the three process controllers 11, 21 and 31 constituting the triplex system. On the other hand, the respective triplexed CPUs 11, 21 and 31 are connected to a network 104 via network connection use boards (NCP) 12, 22 and 32.

To the respective triplexed process controllers 11, 21 and 31 a variety of sensors and operation terminals provided for plant machines and apparatus 71-76 are connected, and from which important operation information of the plants, for example, signals of measured values such as turbine rpm and gas turbine exhaust gas temperature are taken in, since these signals are very important signals for the plant operation, the plant machines and apparatus are also triplexed as (71, 73, 75) and (72, 74, 76).

Further, the CPU 11, PI/O 13 and the plant machines and apparatus 71 and 72 are connected in one to one relationship, the CPU 21, PI/O 23 and the plant machines and apparatus 73 and 74 are connected in one to one relationship and the CPU 31, PI/O 33 and the plant machines and apparatus 75 and 76 are connected in one to one relationship.

An input signal from a plant is taken in independently into the process controller via the respective PI/O and an output signal is likely outputted independently via the respective PI/O. Thereby, reliability of the signals is-enhanced. The plant machines and apparatus 77 and 78 deal such as monitoring signal and an output signal to a lamp indication system. The PI/O 41 connected to these machines and apparatus is a monoplexed PI/O unit, and triplexed process controllers 11, 21 and 31 are connected with the monoplexed PI/O unit through cables 81, 82 and 83 connecting IF boards 15, 25 and 35 packaged at the CPU unit side with UIF boards 42, 43 and 44 packaged at the PI/O unit side.

The input signal from the plant machine and apparatus 77 is taken in the respective process controllers 11, 12 and 13 via the monoplexed process input/output unit (PI/O) 41, and as the output signal to the plant machine and apparatus an output data of a process controller having a master right among the triplex systems (A, B and C systems) is outputted with priority, of which details will be explained in connection with FIG. 15.

A plant machine and apparatus deals such as an important monitoring signal for control operation of such as a plant and a plant machine and apparatus which is required to be inputted continuously even during exchange work due to failure of a process input/output unit and an output signal for a control operation of which error is not permitted. To the machine and apparatus 79 the diplexed PI/Os 51 and 61 are connected. The diplexed PI/Os 51 and 61 are connected with the triplexed process controllers 11, 21 and 31 through cables 84, 85, 86, 87, 88 and 89 connecting IF boards 14, 24, 35 packaged at the CPU unit side with UIF boards 52, 53, 54, 62, 63, 64 packaged at the PI/O unit side.

The input signal from the plant machine and apparatus is taken in the respective process controllers 11, 21 and 31 via the PI/Os 51 and 61. As the output signal to the plant machine and apparatus 79 output data of a process controller having master right is outputted with priority from the PI/Os 51 and 61 (of which details will be explained in connection with FIG. 15). In this instance, through provision of a change-over switch 90 at the outside of the machine and apparatus, a signal either from PI/O 51 or 61 is outputted to the plant machine and apparatus.

Figure 12:
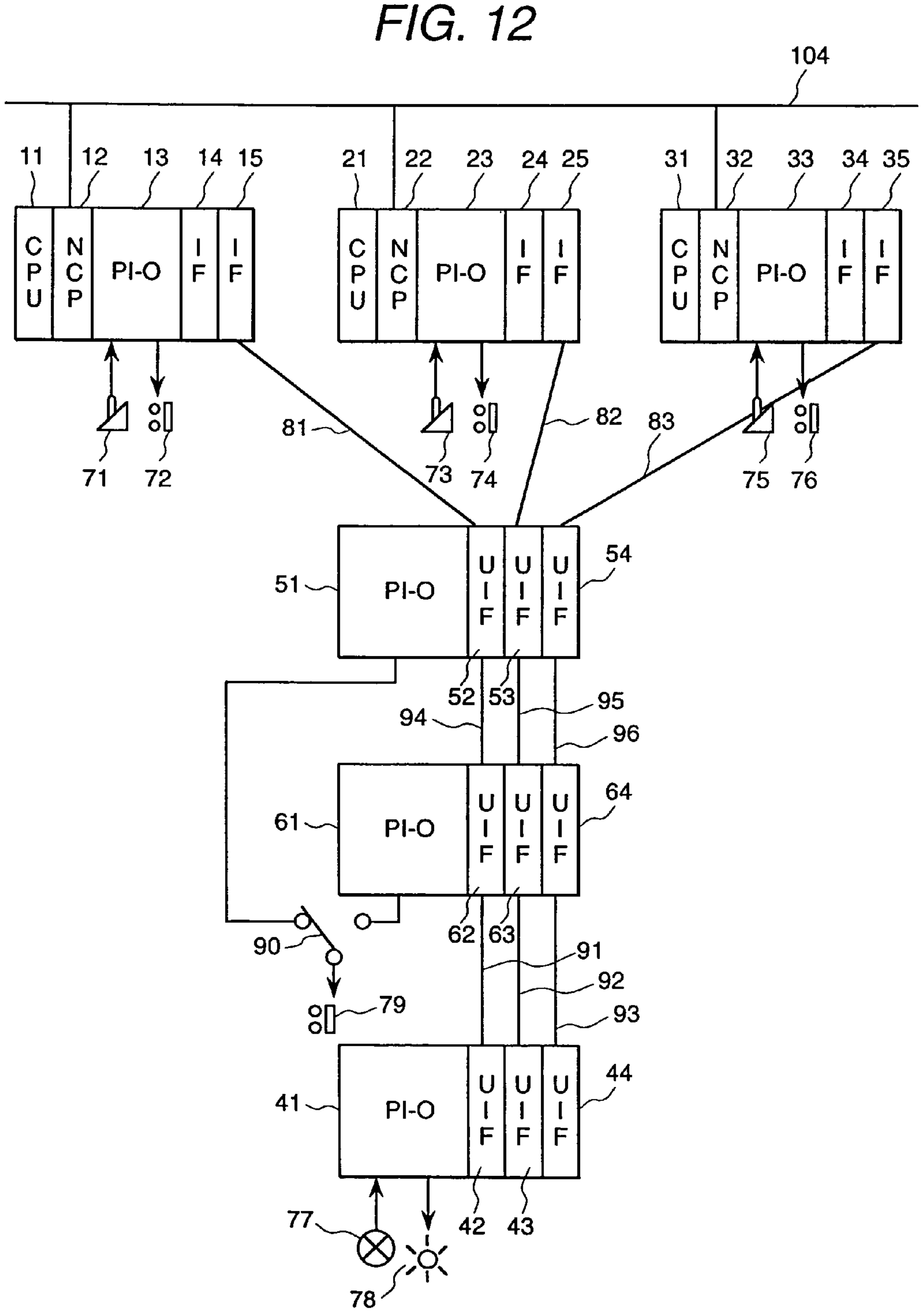
FIG. 12 is a constitutional diagram of a plant control system representing another embodiment according to the second invention.

FIG. 12 is a constitutional diagram of a plant control system representing another embodiment. In the system constitution according to the present embodiment the triplexed process input/output units 13, 23 and 33 and three process controllers constituting a triplex system are connected in one to one relationship, and the diplexed process input/output units 51 and 61 and the monoplexed process input/output unit 41 and the three process controllers 11, 21 and 31 constituting a triplex system are respectively connected in series. Since the structures of the triplexed process controllers, the process input/output units and other units for IF are the same as those in FIG. 11 embodiment, the explanation thereof is omitted.

One PI/O 51 in a diplex system connected to the plant machine and apparatus and the triplexed process controllers 13, 23 and 33 are connected through cables 81, 82 and 83 connecting IF boards-15, 25 and 35 packaged at the CPU unit side with UIF boards 52, 53 and 54 packaged at the PI/O unit side, and the UIF boards 62, 63 and 64 at the other PI/O 61 is connected to the UIF boards 52, 53 and 54 of the PI/O 51 at the one side via the cables 94, 95 and 96. The PI/O 61 is coupled to the side of the triplexed CPU units via the respective UIF boards of the PI/O 51.

The input signal from the plant machine and apparatus 79 is taken in the respective process controllers 11, 21 and 31 via the PI/Os 51 and 61, and as the output signal the output data of a process controller having master right is outputted with priority to the machine and apparatus 79 via the PI/Os 51 and 61. Likely, in this instance through the provision of the change-over switch 90, an output signal either from PI/O 51 or 61 is outputted to the plant machine and apparatus.

The PI/O 41 is provided with the monoplexed plant machines and apparatus 77 and 78, and the UIF boards 42, 43 and 44 are connected to the UIF boards 62, 63 and 64 of the PI/O 61 via the cables 91, 92 and 93. Namely, the PI/O 41 is coupled to the side of triplexed CPU units via respective UIF boards of the PI/Os 61 and 51 inserted in series. The input signal from a plant is taken in the respective process controllers via the PI/O 41, and as the output signal like FIG. 11 embodiment the output data of a process controller having master right is outputted with priority.

In the present embodiment, since the respective PI/Os 41, 51 and 61 are connected in series and are connected to the respective process controllers in a triplex system, it is sufficient if one piece of IF board is packaged for each of the three CPU units (in FIG. 11 embodiment two pieces of IF boards are packaged for each of the CPU units), thereby, an advantage of reducing amount of hardware can be obtained.

Figure 13:
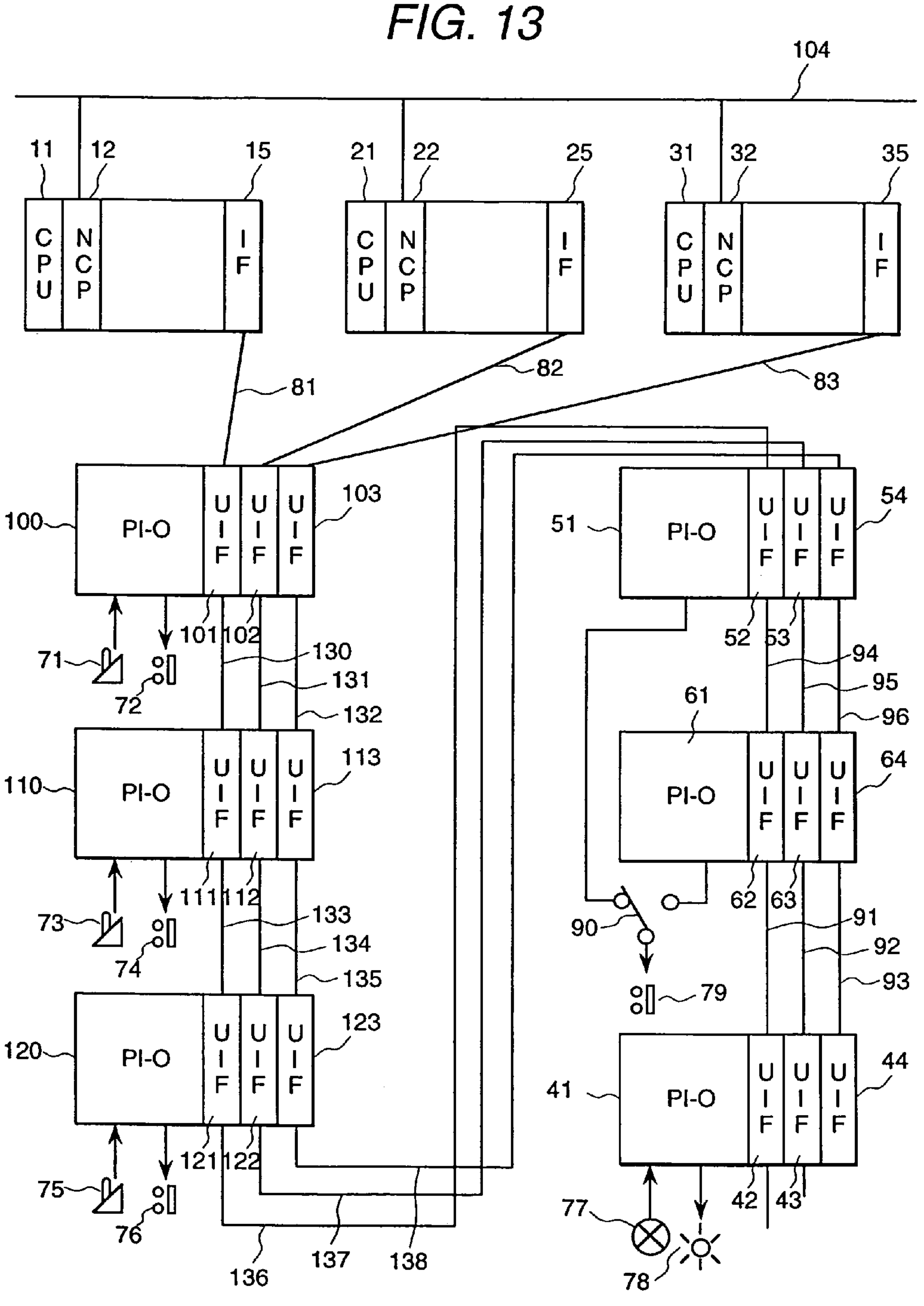
FIG. 13 is a constitutional diagram of a plant control system representing still another embodiment according to the second invention.

FIG. 13 is a constitutional diagram of a plant control system representing still another embodiment. In the present embodiment, each of the CPU units in a triplex system is constituted by a CPU 11 (21, 31), a network connection use board (NCP) 12 (22, 32) and an IF 15 (25, 35), and no PI/O is provided in the CPU units. Each of PI/Os 100, 110 and 120 which constitute process input/output units in a triplex system is provided with three UIF boards (101, 102, 103), (111, 112, 113) and (121, 122, 123). The plant machines and apparatus 71 and 72 are connected to the PI/O 100 for A system, the plant machines and apparatus 73 and 74 are connected to the PI/O 110 for B system and the plant machines and apparatus 75 and 76 are connected to the PI/O 120 for C system.

The UIF 121 of the PI/O 120, the UIF 111 of the PI/O 110, the UIF 101 of the PI/O 100 and the IF 15 of the CPU unit 11 are respectively connected in series through the cables 133, 130 and 81, the UIF 122 of the PI/O 120, the UIF 112 of the PI/O 110, the UIF 102 of the PI/O 100 and the IF 25 of the CPU unit 21 are connected in series through the cables 134, 131 and 82, and the UIF 123 of the PI/O 120, the UIF 113 of the PI/O 110, the 103 of the PI/O 100 and the IF 35 of the CPU unit 31 are connected in series through the cables 135, 132 and 83.

The input signals from the plant machines and apparatus 71-76 are independently taken in the process controllers for respective systems via the corresponding PI/O, and the output signals are independently outputted in the like manner via the corresponding PI/O. Thereby, reliability of the signals is enhanced.

The plant machines and apparatus 77 and 78 are connected to the PI/O 41 in a monoplex system. Further, the plant machine and apparatus 79 is connected to the PI/Os 51 and 61 in a diplex system, the UIF boards of the respective PI/O units are connected in series like FIG. 12 embodiment, and further, in the present embodiment the respective UIF boards 52, 53 and 54 of the PI/O 51 are connected to the UIF boards 121, 122 and 123 of the PI/O 120 through the cables 136, 137 and 138.

Namely, in the present embodiment all of the triplexed PI/Os 100, 110 and 120, the monoplexed PI/O 41 and the diplexed PI/Os 51 and 61 are connected in series, and are connected to the respective triplexed process controllers 11, 21 and 31.

Likely, in the present embodiment the input signal from the plant machine and apparatus 77 is taken in the respective process controllers via the PI/O 41 and as the output signal to the machine and apparatus the output data from a process controller having master right is outputted with priority. Further, the input signal from the plant machine and apparatus 79 is taken in respective process controllers via the PI/Os 51 and 61 as well as via the respective UIF boards of the PI/Os 120, 110 and 100, and as the output signal to the machine and apparatus 79 the output data of a process controller having master right is outputted with priority from either PI/O 51 or 61 selected by the change-over switch 90.

Figure 14:
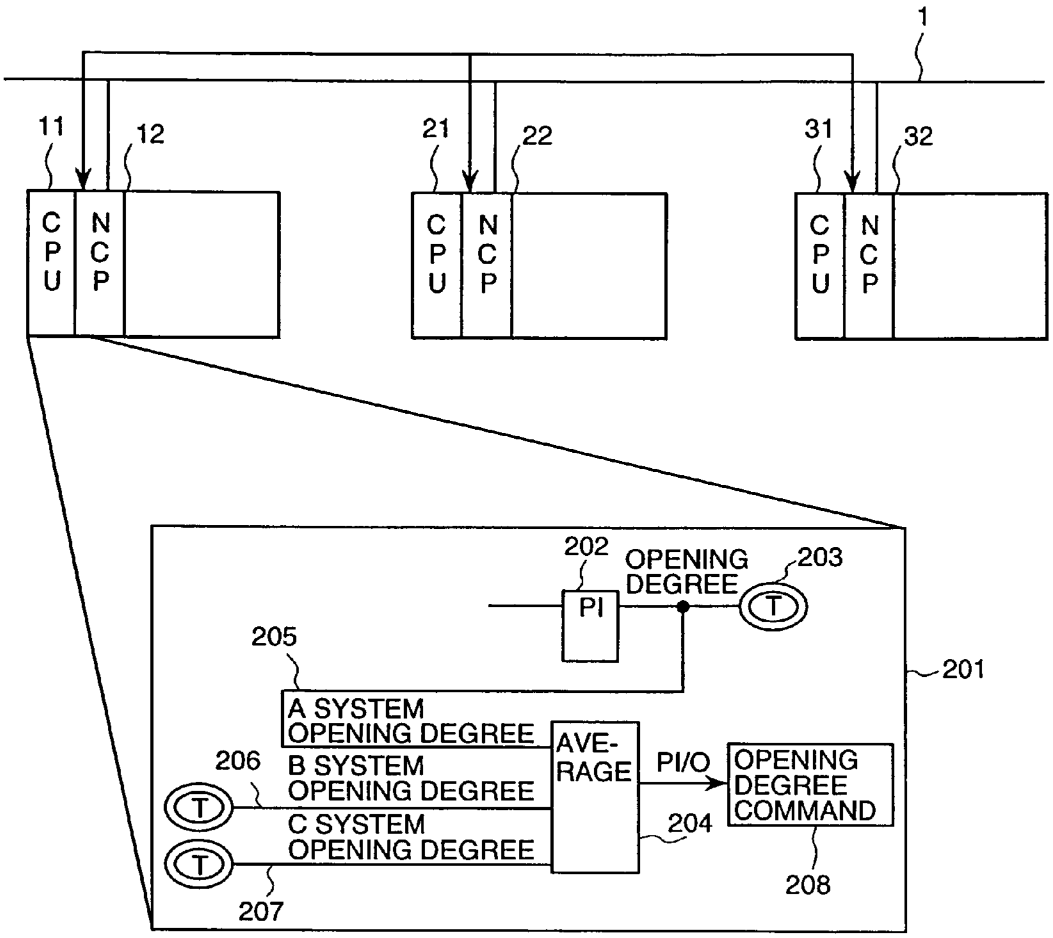
FIG. 14 is a view for explaining data matching method of output data between triplexed process controllers.

FIG. 14 is a diagram for explaining the data matching method of the output data between process controllers in a triplex system under the above explained system structure. The process controllers 11, 21 and 31 in a triplex system are connected to a network 1 through the respective network connection use boards (NCP) 12, 22 and 32. A soft logic 201 is incorporated within each of the respective process controllers 11, 21 and 31. An example of the soft logic 201 shown in FIG. 14 is one incorporated in the process controller 11 for A system, however, the content of the soft logic incorporated in the process controllers for B and C systems is the same as shown.

A calculation result (in this example valve opening degree) by a PI calculator 202 in the soft logic 201 is transmitted to B and C systems via the network 1 (which is indicated by numeral 203). Likely, respective calculation results in B and C systems are also transmitted via the network 1 and are received by A system (206, 207). Respective opening degrees in A, B and C systems are inputted to an average value calculation means 204 which calculates the average value thereof and outputs the same as an opening degree command to the PI/O of the own system under control. Further, in this example, the average value is calculated, however, the command 208 can be generated according to another logic of calculation processing such as majority logic and median logic. Thereby, an output signal which is free from erroneous operation and erroneous non-operation can be obtained.

Figure 15:
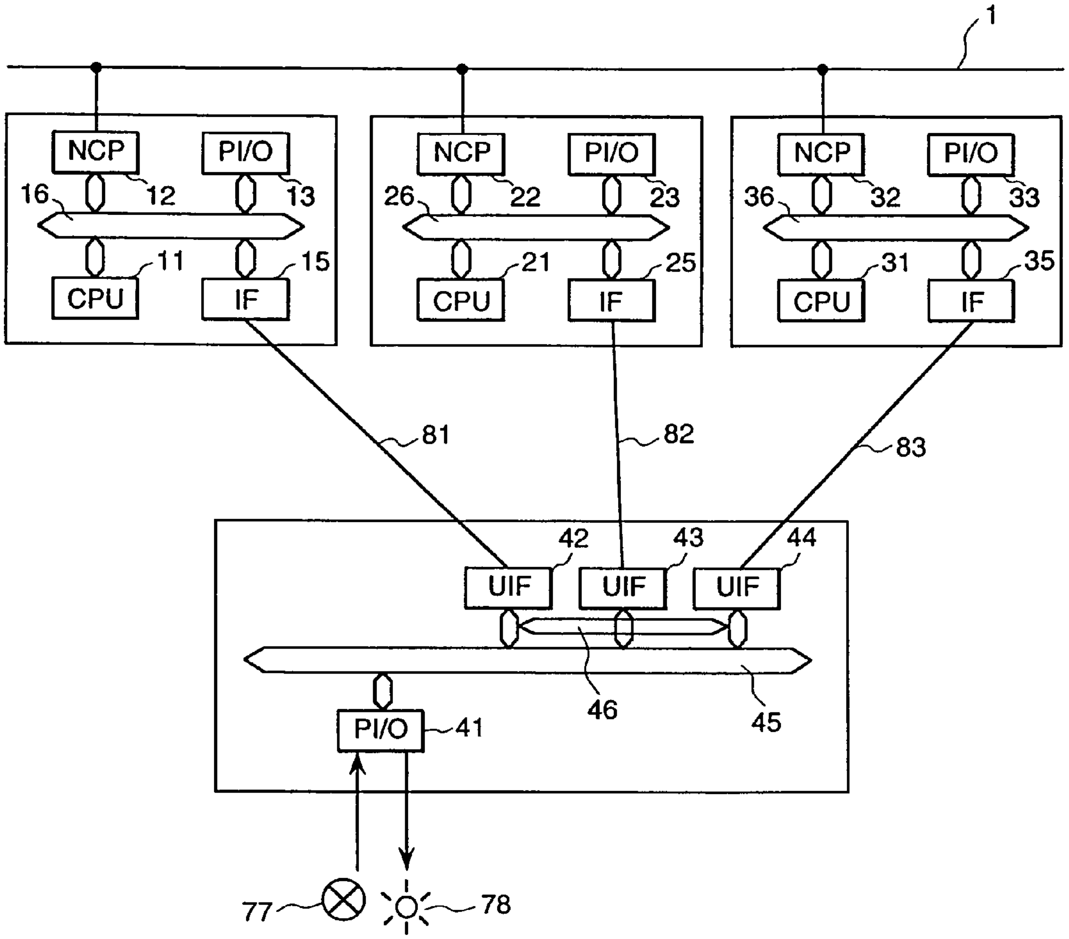
FIG. 15 is a diagram showing a detailed connection structure between a monoplexed PI/O unit and a triplexed CPU unit.

FIG. 15 is a diagram showing details of the connection structure between the monoplexed PI/O 41 and the triplexed CPU units as shown in FIGS. 11 and 12. Each of the triplexed CPU units has the same structure and the process controller 11 (21, 31) is connected to the NCP 12 (22, 33), PI/O 13 (23, 33) and the IF board 15 (25, 35) via a bus 16 (26, 36).

A common process input/output unit 41 for the triplexed process controllers 11, 21 and 31 is connected to UIF boards 42, 43 and 44 via a bus 45 and the UIF boards 42, 43 and 44 are connected to the IF boards 15, 25 and 35 through the cables 81, 82 and 83.

The specification for the buses 16, 26 and 36 is as same as that for the bus 45, therefore, the specification for the PI/Os 13, 23 and 33 becomes same as that for the PI/O 41. Such is true with regard to the diplexed PI/O units. According to the present embodiment, the specification for the PI/O (process input/output unit) can be standardized which further contributes to the cost reduction. Further, the respective UIFs can also be connected with the bus 46 which is used for information reception and transmission between the UIFs.

Figure 16:
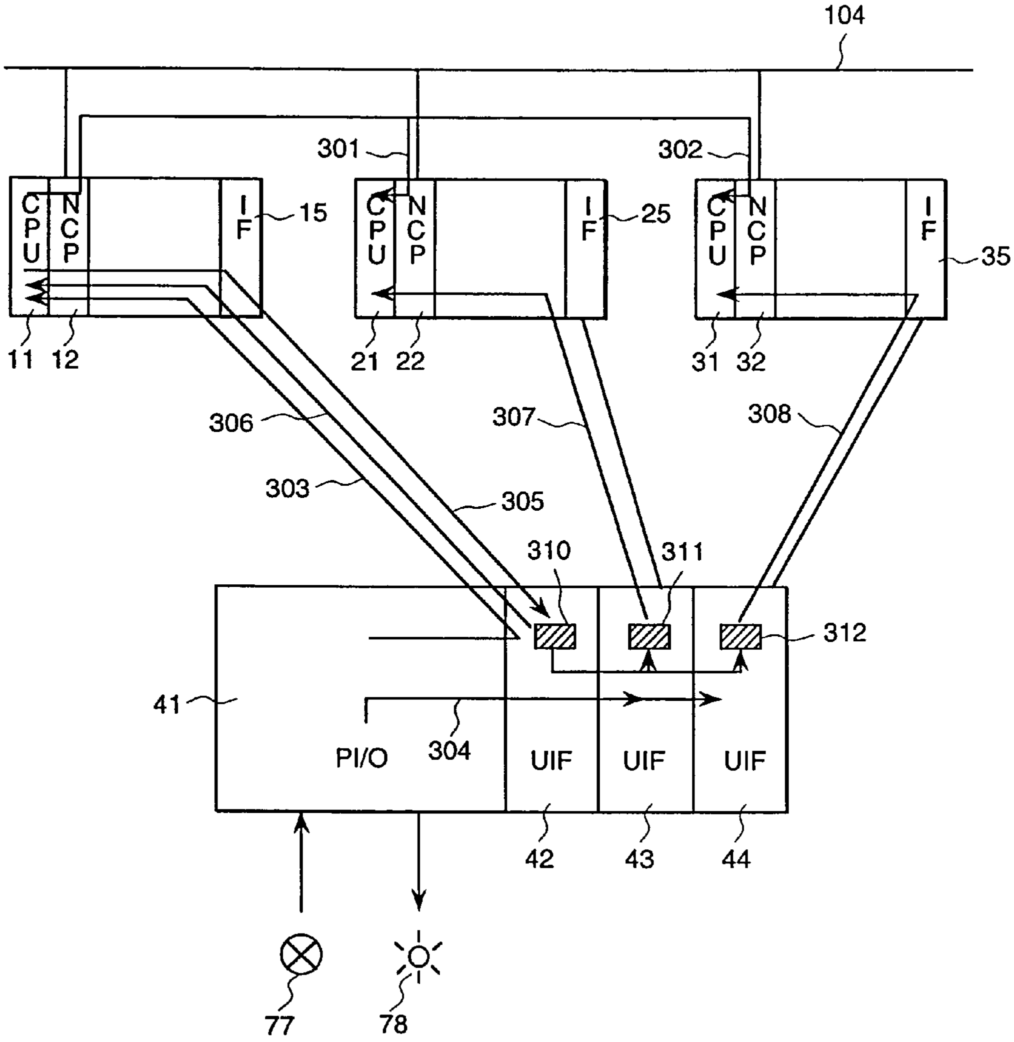
FIG. 16 is a view for explaining a data input method and a mutual monitoring method.

FIG. 16 is, a diagram for explaining a data inputting method and a mutual monitoring method. As has been explained in connection with FIG. 15, in order to standardize the specification for the respective PI/Os (process input/output units) the data input/output processing into the PI/O used in common by the triplexed process controllers is performed at the UIFs packaged in the unit for the respective process controllers and the common process input/output unit.

Among the triplexed process controllers 11, 21 and 31, a controller which outputs data to the common process input/output unit is called as a controller having master right. In FIG. 16 embodiment it is assumed that the CPU 11 is the controller having master right.

The CPU 11 performs the master setting at the UIF 42. In this instance, it is informed through the bus 46 as shown in FIG. 15 to the UIFs 43 and 44 that the CPU 11 is the master. The controller CPU 11 having master right takes in data from the PI/O 41 via the IF 15 and the UIF 42. At this moment, the data input value is copied from the UIF 42 to the UIFs 43 and 44. The controller CPUs 21 and 31 with no master right read these copied data from the UIFs 43 and 44.

The output data are outputted only from the controller CPU 11 having master right. Other than usual data inputting/outputting the controller CPU 11 having master right writes an existence code through step 305 in a certain area 310 within UIF 42 connected to itself.

Further, the CPU 11 reads back the existence code written by itself and confirms through step 306 whether the same matches to the one written by itself. The existence code written through step 305 is copied in areas 311 and 312 on the UIFs 43 and 44 connected respectively to the controller CPUs 21 and 31 having no master right, and the CPUs 21 and 31 respectively read the existence code and confirm soundness of the CPU 11 and the UIFs 42, 43 and 44 through steps 307 and 308.

Other than the above, between the CPUs 11, 21 and 31 tracking of data via the network 1 is used and the respective controllers also monitor whether the data tracking is successful through steps 301 and 302. Further, in FIG. 14 embodiment the data tracking is also performed.

FIG. 17 is a diagram showing an example of PI/O input/output point list (table). Row 501 represents serial No. of input/output points, row 502 represents signal name of the input/output points, low 503 represents redundancy of the input/output units depending on the importance of signals, row 504 represents classification of the signals and rows 505, 506 and 507 represent packaging position of PI/O which performs inputting/outputting of the concerned signal.

The signal bearing serial No. 1 is an input value of gas turbine rpm. Since the importance of the signal is high, the input/output unit is formed in a triplex system and the row 503 is set at "3". With regard to the packaging position thereof slot 5 in unit 1 is set for the respective controllers in a triplex system. When setting is performed as above, the respective process controllers take in gas turbine rpm from own PI/O packaged at slot 5 in unit 1.

The signal bearing serial No. 3 represents a signal showing abnormality of a memory back-up use battery in the controller and since the importance thereof is low, the redundancy of the input/output unit thereof is determined as monoplex. Thus, "1" is set at the row 503. Packaging position of PI/O is set at slot 1 in unit 2. The present signal is inputted under the control of the controller having master right through steps which will be explained in connection with FIGS. 18 and 19.

The signal bearing serial No. 4 represents a signal indicating a fully closed state of the exhaust fan and the redundancy of the input/output unit is set as diplex. Therefore, the row 503 is set at "2". The packaging position of PI/O is set at slot 5 in unit 3 and at slot 5 in unit 4. When the packaging position is set as above, under the control of the controller having master right, an input is usually inputted from the slot 5 in unit 3, but if there is any abnormality at the card, the inputting is performed from the card of slot 5 in unit 4.

Through the use of the input/output point list as has been explained, only by setting the redundancy structure and the packaging structure for every signals, the redundancy structure of the input/output units can be simply and surely determined.

Figure 18:
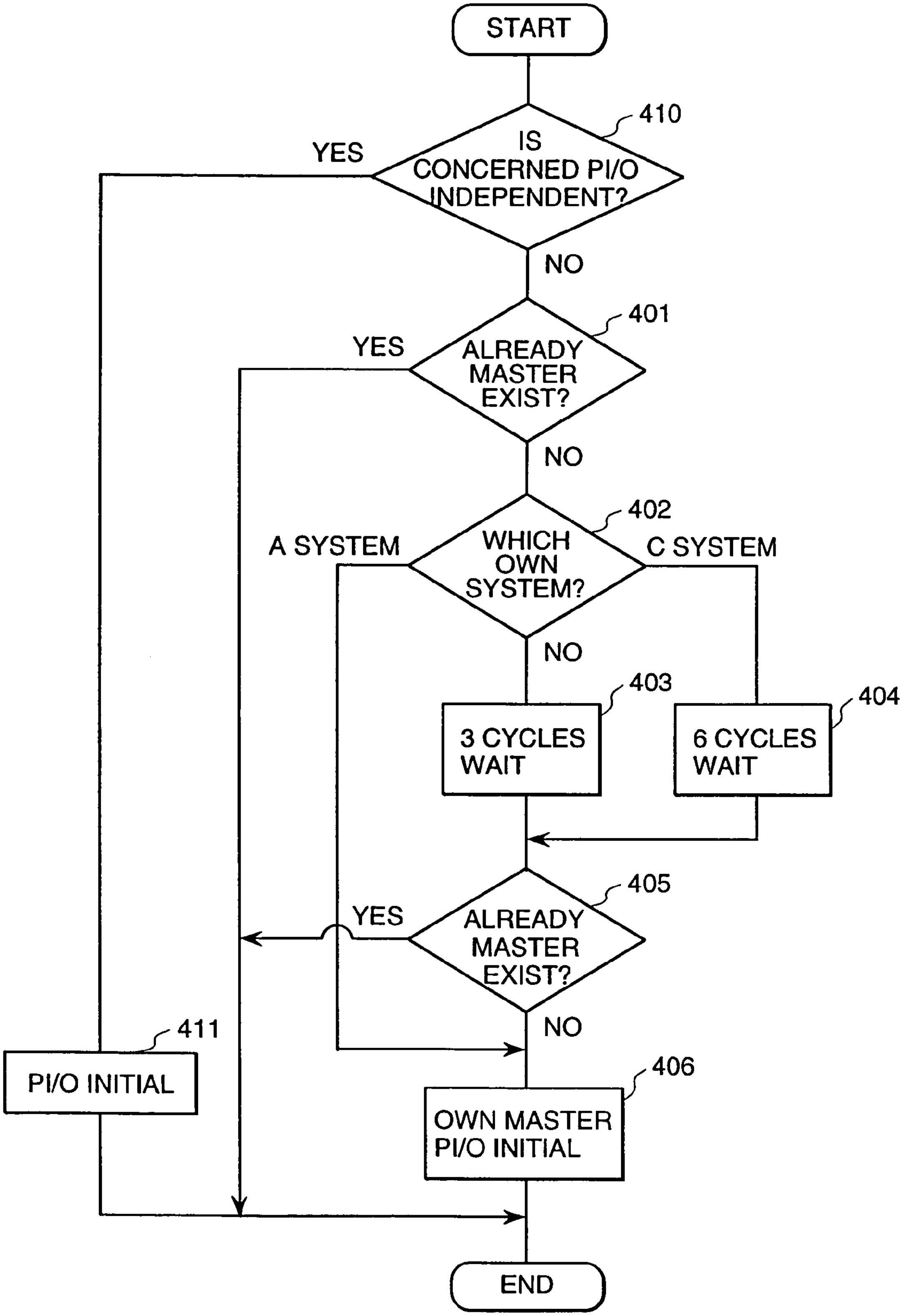
FIG. 18 is a flowchart showing a PI/O initial processing sequence at the time of a system start.

FIG. 18 is a flowchart showing PI/O initial processing steps when starting up the system. When starting up the system, it is necessary to perform the initial processing for the respective PI/Os. In the present embodiment, since the redundancy of the input/output units varies depending on importance of every signal, it is necessary to change a process controller which performs the above initial processing for every signal, thus the initial processing is performed according to the flowchart as shown in FIG. 18.

Therefore, at first it is judged whether the concerned PI/O is independent at step 410. When the concerned PI/O is a PI/O in a triplex system, in that YES, the process advances to step 411 wherein the respective process controllers perform the initial processing for respective PI/O under its control. When the process signal is inputted/outputted via diplexed or monoplexed process input/output units, namely the concerned PI/O is not an independent PI/O. the judgement result NO is given at step 410, and the process advances to step 401.

The steps below the step 401 are the initial processing for the diplexed and monoplexed PI/Os and the process controller having master right performs the initial processing for the respective PI/Os through the following steps.

At step 401, the respective process controllers in a triplex system, after being started, each judges whether one of other systems has already acquired master right. If it is determined that one of the other systems has acquired the master right, the judgement result YES is given at step 401 and the starting-up is completed without acquiring the master right.

When there is no controller having master right at the time of starting-up (in that the judgement result at step 401 is NO), it is judged at the subsequent step 402 whether the own system is A system, B system or C system, and if it is determined that the own system is A system, the process skips to step 406 wherein the own system is started as the master as well as the initial processing is performed for the concerned PI/O.

When-the judgement at step 402 shows that the own system is B system, the process advances to step 403 and waits there for 3 cycles as it is, and when the judgement shows that the own system is C system, the process advances to step 404 and waits there for 6 cycles as it is, and thereafter advances to step 405. At step 405 it is confirmed whether there is a system which has acquired the master right, and if it is determined some other system has already acquired the master right (in that the judgement result is YES), the starting-up thereof is completed without acquiring the master right.

If it is determined that no system has acquired the master right (in that the judgement result at step 405 is NO), the process advances to step 406 and starting-up of the own system as the master as well as the initial processing is performed for the concerned PI/O. Namely, a system which starts up first acquires the master right, and when the starting-up occurs at the same time, the master right is taken by A system with priority so as to prevent conflict.

Figure 19:
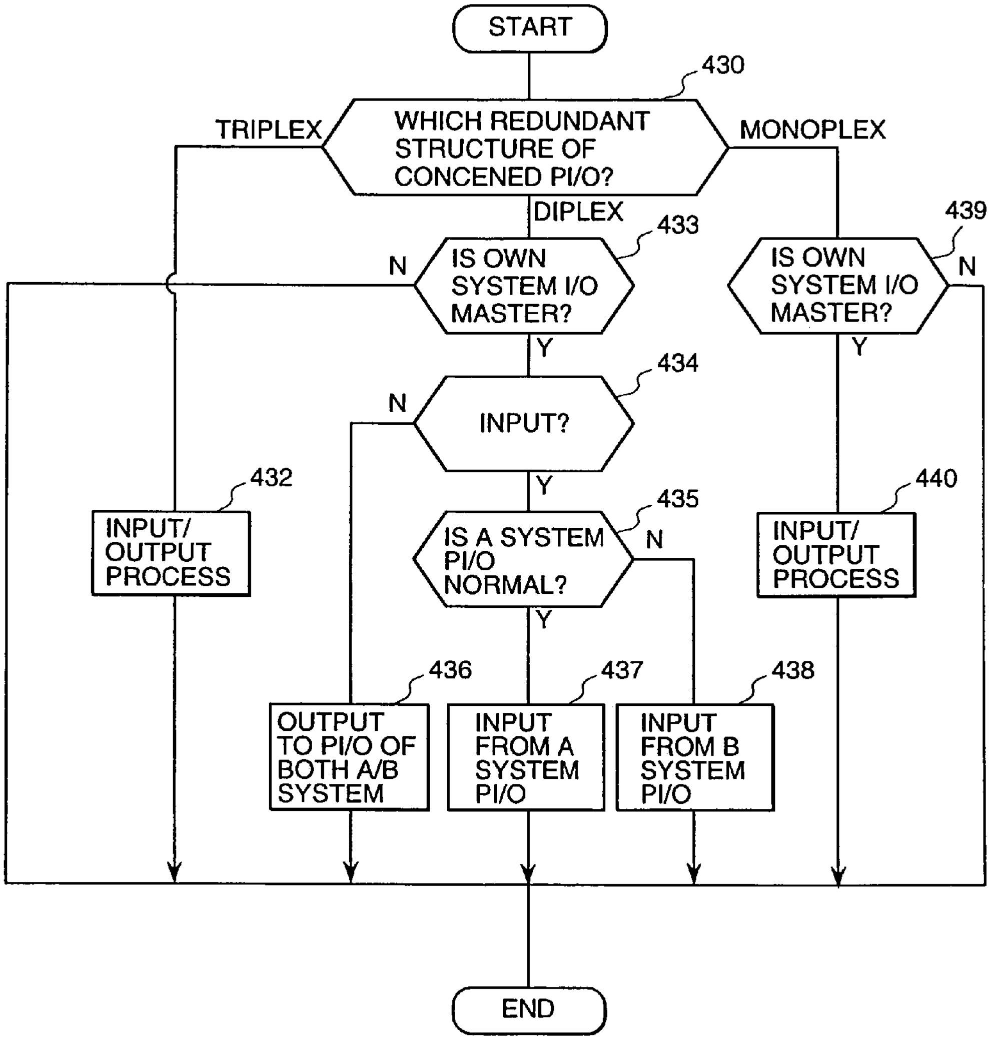
FIG. 19 is a flowchart showing a processing sequence for a PI/O input/output method.

FIG. 19 is a flowchart showing input/output steps in IP/O. In the input/output processing in PI/O, at first the redundancy structure of concerned card (PI/O) is investigated with reference to the redundancy structure in the redundancy structure setting table (input/output point list) with regard to PI/O as explained in connection with FIG. 17 (step 430).

When the concerned card is in a triplex system, the process advances to step 432 and the input/output processing is performed for the concerned card to complete the process.

When it is determined that the concerned card is in a diplex system based on the judgement result at step 430, the process advances to step 433 wherein it is judged whether the own system has the master right. If it is determined that the system has no master right (in that the judgement result is N), no processing is performed because of no accessing right to the concerned card and the process advances to the input/output processing for the subsequent card.

When it is judged at step 433 that the system has the master right (Y), the process advances to the subsequent step 434 wherein it is judged whether the concerned card is an input card. When the concerned card is an output card, the judgement result turns out as N and the process advances to the subsequent step 436 and the data is outputted to the PI/Os in a diplex system in A/B both systems. When the concerned card is an input card, the judgement result at step 434 turns out as Y, the process advances to the subsequent step 435 wherein it is checked whether the PI/O in A system is normal. When the PI/O in A system is normal (in that judgement result in step 435 is Y), the process advances to step 437 wherein input processing from the PI/O in A system is performed. When the PI/O in A system is abnormal (in that the judgement result at step 435 is N), the process advances to step 438 wherein the input processing from the PI/O in B system is performed.

When it is determined based on the judgement result at step 430 that the concerned card is a single system (monoplex system), subsequently, it is judged whether the own system has the master right (step 439). When it turns out that the system has no master right (judgement result is N), no processing is performed because of no accessing right to the concerned card and the process advances to input/output processing for the subsequent card. When the system has the master right the process advances from to step 440 wherein the input/output processing is performed for the concerned card and then the process advances to the input/output processing for the subsequent card.

As has been explained above, the process controller having the master right performs data input/output for the PI/Os in a diplex system and in a monoplex system.

Further, in the above explained respective embodiments, a common structure is used for triplexed, diplexed and monoplexed process input/output units, the inputting/outputting for the process input/output units in a triplex system is performed by the respective process controllers, the outputting for the process input/output units in a diplex system and in a monoplex system is performed by one process controller having the master right among the process controllers in a triplex system, further, the inputting is performed at the input timing of the process controller having the master right and the remaining process controllers take in the input value after being copied, the present system is constituted to support all of the constitution by the single controller, thereby, the cost reduction of the system can be realized.

Further, the output signals of the process input/output units in a diplex system and in a monoplex system are processed in the respective calculation processing units in the process controllers in a triplex system, the calculation result of the respective calculation processing units is further processed through majority logic, median logic or averaging logic to output the thus processed result, thereby, a sudden change of output value can be prevented, even when an abnormality occurs in the process controller having the master right or even when the master right is changed-over to another process controller in case when a manual handling from the outside is required.

Still further, the process controller having the master right writes the existence code periodically into the process input/output unit in a diplex system and in a monoplex system, reads back the existence code and compares the same with the written existence code, thereby, the soundness of the input/output units can be confirmed. Further, the process controllers having no master right read out the existence code written by the process controller having the master right from the process input/output unit, thereby, the soundness of the process controller having the master right and the process input/output unit can be confirmed.

Still further, when abnormality of the existence code-is monitored, the process controller having the master right abandons the master right, if other systems are normal, further, when there is an abnormality in the copying function of the process input or the monitoring function of the existence code which is to be transferred from the process controller having the master right, the process controllers having no master right can place own system in an exclusion mode so as not to acquire the master right.

Still further, when a state continues in which other system than the process controller which is required to acquire the master right among the process controllers in a triplex system keeps the master right, the process controller which is required to acquire the master right can be designed to have a function which causes the process controller still keeping the master right to abandon the master right.

Still further, since respective redundancy structures can be set for the respective input/output use card, units having different redundancy structures can be included within the system as well as input/output cards having different redundancy structures can also be included within a same unit.

According to the hitherto explained embodiments, the process signals to be inputted/outputted are classified into three types depending on importance with regard to process control and the system is constituted in such a manner that the most important signals are inputted/outputted through the triplexed process input/output unit, the nextly important signals are inputted/outputted through the diplexed process input/output unit and the other signals are inputted/outputted through the monoplexed process input/output unit, thereby, the size and cost reduction of the system can be achieved in comparison with a case wherein all of the input/output units are triplexed.

In this instance, as the most important signals monitoring input signals necessary for protection and safety of plants and plant machines and apparatus such as turbine rpm and gas turbine exhaust gas temperature in a thermal power generation plant rpm and flow rate of a recirculation pump in a nuclear power generation plant, and operation and control command output signals with which no erroneous operation and the no erroneous non operation are permitted, are included, as the nextly important signal such as important monitoring signals with regard to control and operation of the plant and the plant machines and apparatus which are required to be continuously inputted even during exchange work of the process input/output units due to failure thereof and control and operation output signals with which no erroneous operation is permitted, are included, and as the other signals monitoring signals of which inputting can be replaced by other signals, signals for recording such as in a journal and output signal to lamps and indicators of which temporarily interruption during such as exchange work of the process input/output unit due to failure thereof does not affect continuing operation of the plant, are included, thereby, the size and cost reduction of the system can be achieved while keeping the reliability of the plant control device high.

When varying the redundancy structure depending on importance of the signals, other than the triplexed process input/output units in which the process input/output units are independently connected to the respective three processor units in a redundancy structure, through connecting the diplexed process input/output units and the monoplexed process input/output unit to all of the three processor units, a single processor unit is permitted to control all of the input/output units, thereby, further cost reduction of the system can be realized.

Still further, for the purpose of simplifying the connection between the process input/output units and the processor units, when connecting the processor units with the process input/output units, if the processor units and the plural process input/output units are connected in series and the redundancy structure of the process input/output units is designed in the connection, a further size reduction of the system can be realized. In such instance, it is also possible to connect plural process input/output units in series for every combination of one processor unit and a process control device having the same redundancy.

The data inputting/outputting for the triplexed input/output units is respectively performed by the triplexed and asynchronously operating processor units, however, the system is constituted so that the data outputting through the diplexed or monoplexed process input/output units is-to be performed by one of the processor units, a possible accessing conflict by the triplexed processor units can be avoided.

In order to vary redundancy of the input/output units depending on the importance of the signals it is necessary to discriminate for every signal whether the access right be assigned to a representative processor unit or be assigned to respective processor units independently. Since a circuit, which varies redundancy of the input/output units depending on the importance of the signals and determines an accessing processor unit, becomes very complex which causes to increase failure rate thereof, therefore, it is preferable to realize such circuit by a standard software operable in the processor unit and to include only a limited hardware circuit which absolutely prevents an erroneous output even when plural processor units make access due to such as abnormality.

Further, since the importance of the signals is known by the person setting the same and can not be recognized automatically by the software, the system is constituted in such a manner that by means of the input/output point list (table) redundancy structures are set for every signal and the allocating positions of the input/output units therefor are set, thereby, the redundancy setting for every signal can be performed simply and accurately and an erroneous setting thereof can be prevented.

As has been explained hitherto, the size reduction of the process input/output units and rationalization of such as amplifier circuits of signals and selection circuits thereof outside the process input/output units are enabled and amount of resources can be cut, thereby, the size of the device is reduced and simplified which improves the maintenance interval and cost.

Further, since the processor units and the plural process input/output units are designed to permit series connection, the redundancy structure of the process input/output units can be realized in the connection, and the connection between the process input/output units and the processor units can be simplified, further since the plural process input/output units are connected in series for every combination of one processor unit and process control devices having the same redundancy, even if a failure is caused at the connection between the process input/output units, no influence is effected to inputting/outputting of other important signals having further high redundancy.

Further, since the judgement circuit with regard to accessing right for the input/output units having different redundancy is constituted by a software circuit, simplification of the hardware circuit can be realized, thereby, reliability of the system is enhanced and cost thereof can be cut.

INDUSTRIAL FEASABILITY

According to the first invention, since signal transmission and reception between microcomputers is performed not through transmission lines but through buses, information matching speed can be improved in comparison with the conventional information matching using the transmission lines, further through a common use of an input/output hard interface unit inputting/outputting and monitoring of plant process variable can be performed by the single input/output hard interface unit, thereby, number of wires and the process input/output units can be reduced, thus system scale can be limited and the maintenance area can be reduced which also improves maintenance property of the system.

According to the second invention, since the inputting/outputting of signals necessary for continuous operation of the present plant is performed through continuing inputting/outputting to the redundancy process input/output units, amount of resources of process input/output units in a triplex system can be cut without reducing reliability of continuous plant operation, thereby, size and cost reduction and simplification-of the process input/output units can be realized which also improves maintenance property and reduces maintenance cost.

The invention claimed is:

1. A multiplexing control system comprising a sensor which detects a state variable in a process; plural microcomputers which are inputted of a process signal detected by the sensor and output a control signal for the process and one of which operates as a master; a process input/output unit which is provided in common for the plural microcomputers and distributes a process signal detected by the sensor respectively to the plural microcomputers, wherein the process input/output unit includes interface boards corresponding respectively to the plural microcomputers and the process signal inputted to the microcomputer operating as the master is written in a memory corresponding to the other microcomputer;

in which process input/output units which input/output process signals are provided for every process signal, wherein a redundancy structure of each of the process input/output units which inputs/outputs a concerned process signal is varied depending on the type of the process signals and further a signal of a process input/output unit having small redundancy is designed to be inputted/outputted via a process input/output unit having large redundancy.

2. A multiplexing control system comprising a sensor which detects a state variable in a process; plural microcomputers which are inputted of a process signal detected by the sensor and output a control signal for the process and one of which operates as a master; a process input/output unit which is provided in common for the plural microcomputers and distributes a process signal detected by the sensor respectively to the plural microcomputers, wherein the process input/output unit includes interface boards corresponding respectively to the plural microcomputers and the process signal inputted to the microcomputer operating as the master is written in a memory corresponding to the other microcomputer;

in which process input/output units which input/output process signals are provided for every process signal, wherein the process input/output unit for the process signal of a "high" importance is triplexed as well as a process controller having a processing function is provided for each of the triplexed input/output units, the process input/output unit for the process signal of an "intermediate" importance is diplexed, the process input/output unit for the process signal of a "low" importance is monoplexed as well as the output of the respective process signals of the diplexed input/output unit and the monoplexed input/output unit is designed to be processed by either of the process controllers.

3. A multiplexing control system according to claim 2, wherein by designating one of the triplexed process controllers as having a master right the system is constituted in such a manner that the output control of the diplexed input/output unit and the monoplexed input/output unit is performed by the unit having the master right.

4. A method of multiplexing of a multiplexing control system comprising a sensor which detects a state variable in a process; plural microcomputers which are inputted of a process signal detected by the sensor and output a control signal for the process and one of which operates as a master; a process input/output unit which is provided in common for the plural microcomputers and distributes a process signal detected by the sensor respectively to the plural microcomputers, wherein the process input/output unit includes interface boards corresponding respectively to the plural microcomputers and the process signal inputted to the microcomputer operating as the master is written in a memory corresponding to the other microcomputer;

in which process input/output units which input/output process signals are provided for every process signal, wherein the redundancy structure of the input/output units for inputting and outputting process signals are either triplexed, diplexed or monoplexed depending on importance of the process signals.

* * * * *